(12) United States Patent
Vontobel et al.

(10) Patent No.: US 11,379,763 B1
(45) Date of Patent: Jul. 5, 2022

(54) ONTOLOGY-BASED TECHNOLOGY PLATFORM FOR MAPPING AND FILTERING SKILLS, JOB TITLES, AND EXPERTISE TOPICS

(71) Applicant: STARMIND AG, Zurich (CH)

(72) Inventors: Marc Vontobel, Meilen (CH); Stijn Vermeeren, Zurich (CH); Joachim Ott, Zurich (CH)

(73) Assignee: Starmind AG, Zurich (CH)

( * ) Notice: Subject to any disclaimer, the term of this patent is extended or adjusted under 35 U.S.C. 154(b) by 0 days.

(21) Appl. No.: 17/398,735

(22) Filed: Aug. 10, 2021

(51) Int. Cl.
  *G06Q 10/06* (2012.01)
  *G06N 3/08* (2006.01)
  *G06F 16/22* (2019.01)
  *G06F 16/28* (2019.01)

(52) U.S. Cl.
  CPC .  *G06Q 10/063112* (2013.01); *G06F 16/2246* (2019.01); *G06F 16/285* (2019.01); *G06N 3/08* (2013.01)

(58) Field of Classification Search
  USPC ......................................................... 705/7.14
  See application file for complete search history.

(56) References Cited

U.S. PATENT DOCUMENTS

| 5,724,594 | A | 3/1998 | Pentheroudakis |
| 7,269,544 | B2 | 9/2007 | Simske |
| 7,395,222 | B1 | 7/2008 | Sotos |
| 7,555,441 | B2 * | 6/2009 | Crow ..................... G06Q 10/10 705/7.14 |
| 7,865,457 | B2 | 1/2011 | Ravin |
| 8,078,565 | B2 | 12/2011 | Arseneault |
| 8,266,098 | B2 | 9/2012 | Hu |
| 8,280,882 | B2 | 10/2012 | Troy |
| 8,533,208 | B2 | 9/2013 | Sundaresan |
| 8,650,177 | B2 | 2/2014 | Skomoroch |
| 8,700,599 | B2 | 4/2014 | Udupa |
| 8,751,218 | B2 | 6/2014 | Dang |
| 9,424,524 | B2 | 8/2016 | Dave |
| 10,191,951 | B1 | 1/2019 | Bronstein |
| 10,223,646 | B1 | 3/2019 | Vontobel |
| 10,878,174 | B1 | 12/2020 | Vontobel |
| 2003/0140037 | A1 | 7/2003 | Deh-Lee |
| 2003/0158867 | A1 | 8/2003 | Goodwin |
| 2005/0125216 | A1 | 6/2005 | Chitrapura |
| 2009/0248399 | A1 | 10/2009 | Au |
| 2009/0254540 | A1 | 10/2009 | Musgrove |
| 2011/0225140 | A1 | 9/2011 | Wu |

(Continued)

FOREIGN PATENT DOCUMENTS

| CA | 2777520 | 4/2011 |
| CA | 2809769 | 9/2014 |

(Continued)

OTHER PUBLICATIONS

Aditi "Cross-Platform Expertise Characterization for Question Routing Author", Dec. 2017, Computer Science Track Software Technology, pp. 1-67 (Year: 2017).*

(Continued)

*Primary Examiner* — Romain Jeanty
(74) *Attorney, Agent, or Firm* — Sheppard Mullin Richter & Hampton LLP

(57) ABSTRACT

Systems and methods are provided for generating and using an ontology-based technology platform and job titles data structure for mapping skills with job titles.

25 Claims, 16 Drawing Sheets

(56) References Cited

U.S. PATENT DOCUMENTS

| | | | |
|---|---|---|---|
| 2012/0117092 A1 | 5/2012 | Stankiewicz | |
| 2012/0130934 A1 | 5/2012 | Brillhart | |
| 2012/0197906 A1* | 8/2012 | Landau | G06Q 10/00 707/748 |
| 2013/0117383 A1 | 5/2013 | Hymel | |
| 2013/0218644 A1 | 8/2013 | Kasravi | |
| 2014/0164476 A1 | 6/2014 | Thomson | |
| 2014/0304249 A1 | 10/2014 | Ayzenshtat | |
| 2015/0169770 A1 | 6/2015 | Brandstetter | |
| 2015/0317303 A1 | 11/2015 | Zhang | |
| 2015/0379112 A1* | 12/2015 | Lau | G06Q 10/10 707/738 |
| 2016/0170965 A1 | 6/2016 | Gerard | |
| 2016/0350404 A1 | 12/2016 | Smith | |
| 2017/0249566 A1 | 8/2017 | Mandel | |
| 2020/0160224 A1 | 5/2020 | Vontobel | |

FOREIGN PATENT DOCUMENTS

| | | | |
|---|---|---|---|
| EP | 0952533 | 10/1999 | |
| EP | 1217533 | 6/2002 | |
| WO | WO-2016142531 A1 * | 9/2016 | G06Q 10/10 |

OTHER PUBLICATIONS

Marcia et al "Determining Job Groups Application of Hierarchical Agglomerative Cluster Analysis in Different Job Analysis Situations", Personnel Psychology, pp. 743-762 (Year: 1991).*

Elisa et al "Ontology-based Skills Demand and Trend Analysis", Jul. 2016, ResearchGate, pp. 1-15 (Year: 2016).*

* cited by examiner

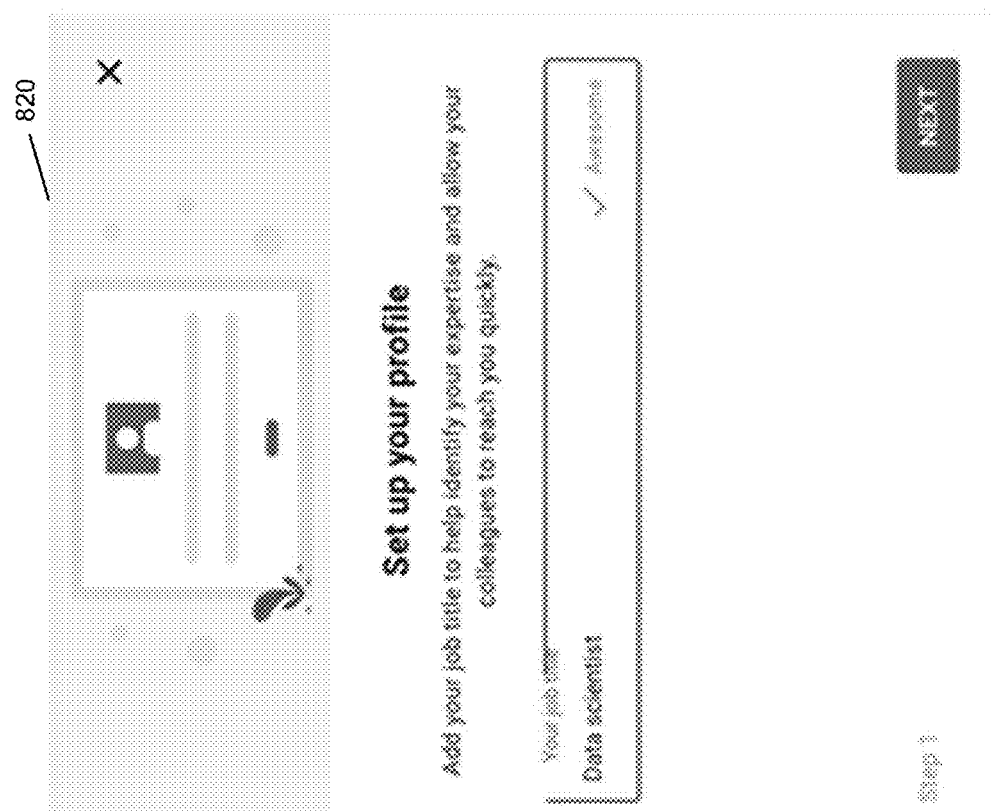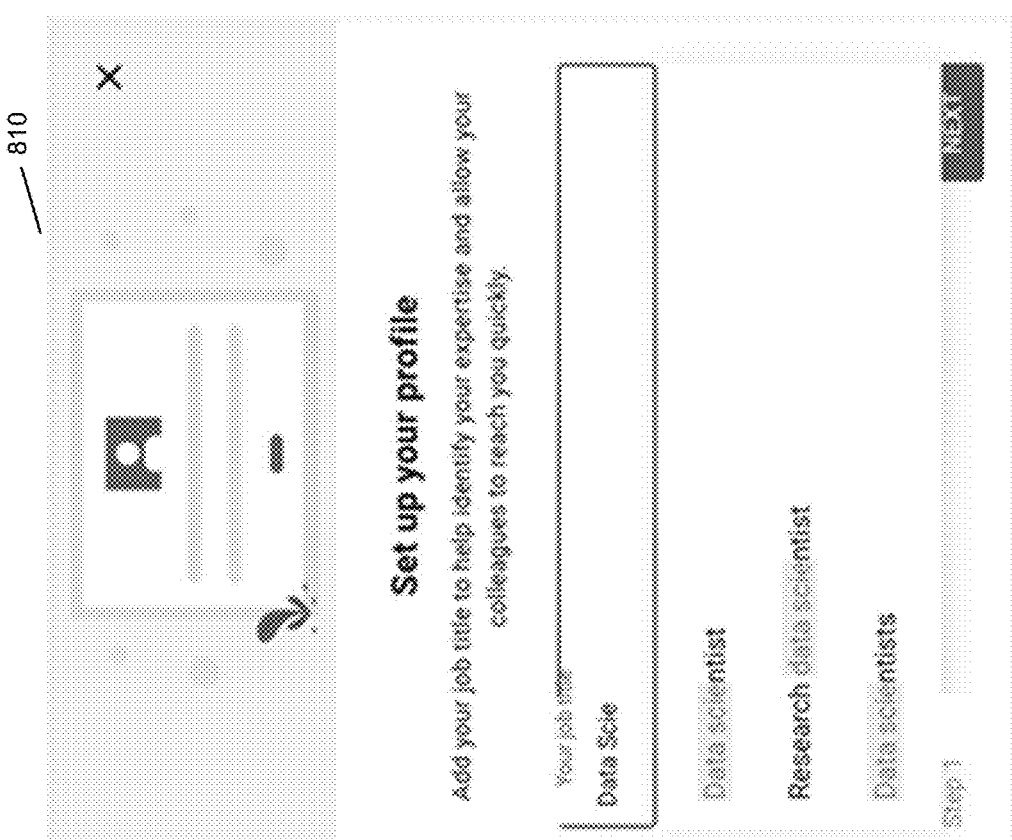
FIG. 8

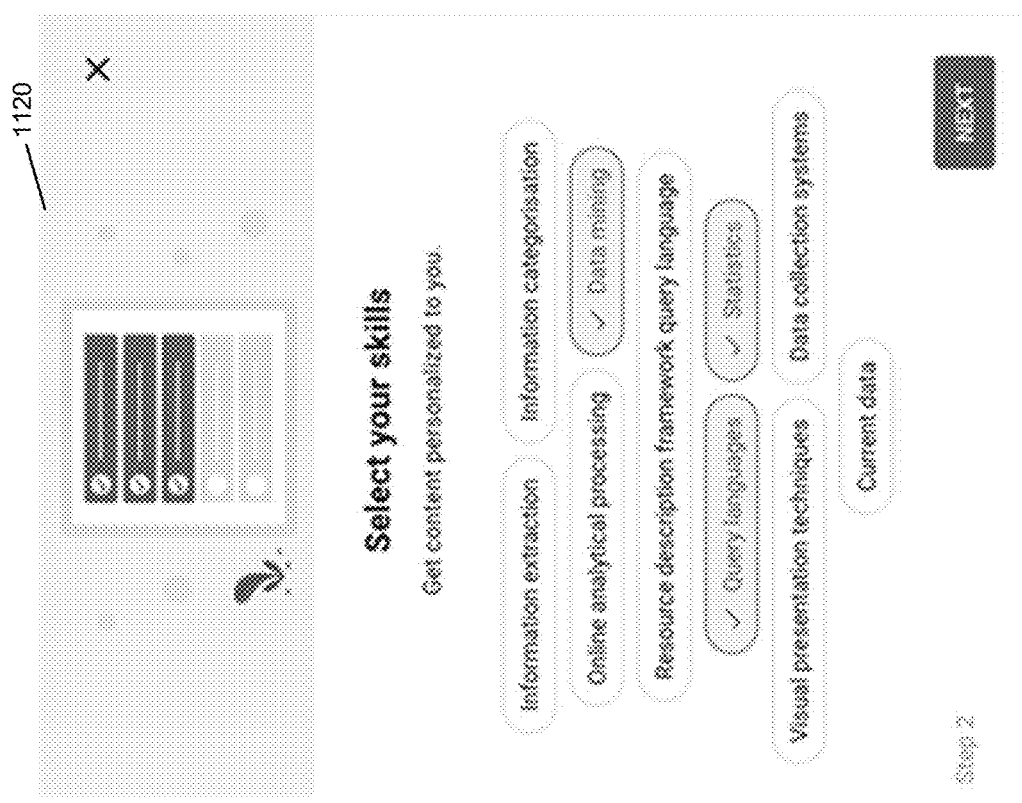
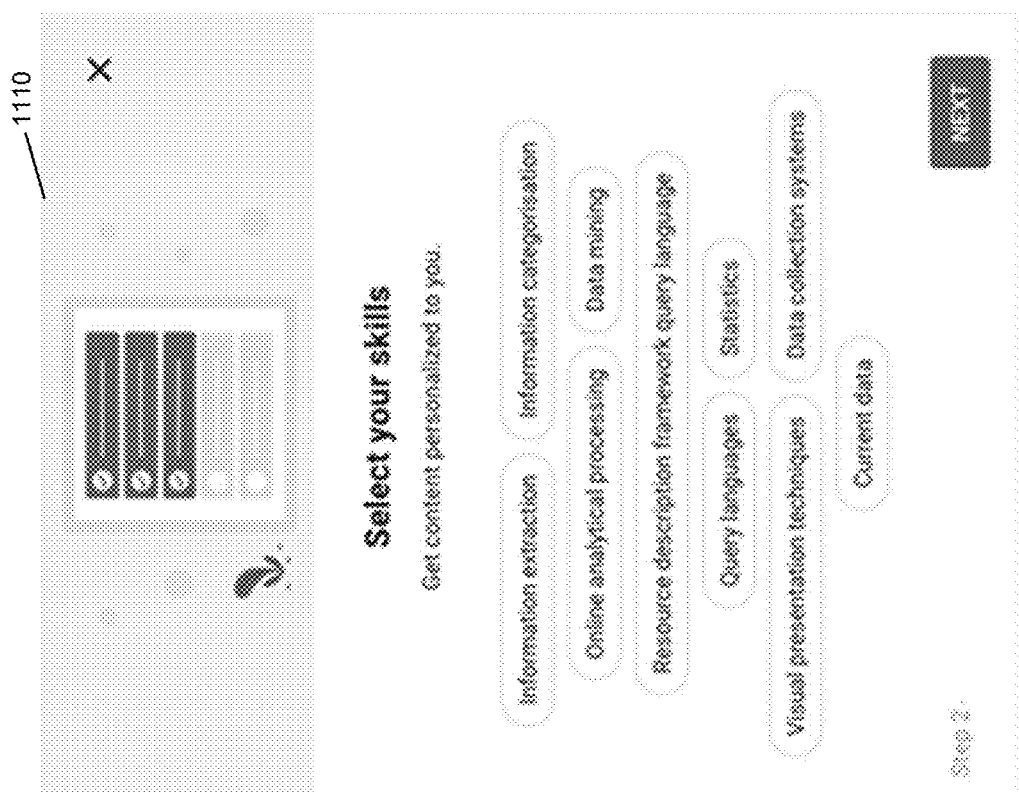
FIG. 11

Mobile App Development  92% match

Location: Berlin, Germany
Workload: 3 weekly hours

Join us in the process of designing, developing, testing, and launching mobile applications destined for mobile devices, such as smartphones or tablets, written to perform a particular and specific purpose. They are typically developed on iOS, Android, and Windows platforms. See More Project Date: 01.03.21 - 04.03.21

Use case D Deepdive  89% match

Location: Zürich, Switzerland
Workload: 8 weekly hours

We will take a research approach to generate an in-depth, multi-faceted understanding of a complex issue in its real-life context. It is an established research design that is used extensively in a wide variety of disciplines, particularly in the social sciences... See More Project Date: 05.01.21 - 05.21.21

WFH Company Wellness Assessment  73% match

Location: Remote
Workload: 8 weekly hours

We will take a research approach to generate an in-depth, multi-faceted understanding of a complex issue in its real-life context. It is an established research design that is used extensively in a wide variety of disciplines, particularly in the social sciences... See More Start Date: 05.03.21 - 05.05.21

RFSA Research  68% match

Location: Remote
Workload: 3 weekly hours

We will take a research approach to generate an in-depth, multi-faceted understanding of a complex issue in its real-life context. It is an established research design that is used extensively in a wide

ONTOLOGY-BASED TECHNOLOGY PLATFORM FOR MAPPING AND FILTERING SKILLS, JOB TITLES, AND EXPERTISE TOPICS

FIELD OF THE INVENTION

The systems and methods described herein relate to generating and using an ontology-based technology platform and a job titles data structure for mapping skills, job titles and topics (e.g., expertise topics).

BACKGROUND OF THE INVENTION

Conventional approaches to assess whether a person's job-related skills match those needed for a posted job title suffer from various known drawbacks. Technical solutions to assist with the automation of this task suffer from numerous technical limitations and drawbacks.

Various datasets related to jobs and skills are known. For example, the ESCO dataset is a multilingual classification of Skills, Competences, Qualifications and Occupations maintained by the European commission. The ESCO dataset includes a set of job titles and corresponding skills, where the jobs are classified according to the International Standard Classification of Occupations (ISCO) classifications. The dataset contains different occupations in each language that are presented with their preferred label and a list of alternative labels, if any, and are classified according to ISCO classifications. The dataset also provides a mapping of job titles with their corresponding skills.

The skills in ESCO are organized with several hierarchical layers, so skills are grouped into skill groups/categories. These groups are further grouped into higher level groups and so on. Each skill group also has a name describing its broad concept. On the very top of this ontology tree are only a handful of nodes, each covering a very broad set of skills.

The ISCO classifies jobs into a clearly defined set of groups according to the tasks and duties undertaken in the job. Specifically, the classification consists of 10 major job groups, and up to 4 hierarchy levels. The main groups are:

Armed forces occupations (Group 0)
Managers (Group 1)
Professionals (Group 2)
Technicians and associate professionals (Group 3)
Clerical support workers (Group 4)
Service and sales workers (Group 5)
Skilled agricultural, forestry and fishery workers (Group 6)
Craft and related trades workers (Group 7)
Plant and machine operators and assemblers (Group 8)
Elementary occupations (Group 9)

Its structure follows a grouping by education level. The two latest versions of ISCO are ISCO-88 (dating from 1988) and ISCO-08 (dating from 2008). As shown for example in FIG. 1, in ESCO, each occupation is mapped to exactly one ISCO-08 code. ISCO-08 can therefore be used as a hierarchical structure for an occupations pillar. ISCO-08 provides the top four levels for the occupations pillar. ESCO occupations are located at level 5 and lower. FIG. 1 illustrates the role of ISCO 08 in the hierarchical structure of the ESCO occupations pillar.

Since ISCO is a statistical classification, its occupation groups do not overlap. Each ESCO occupation is therefore mapped to only one ISCO unit group. It follows from this structure, that ESCO occupation concepts can be equal to or narrower than ISCO unit groups, but not broader. The result is a strictly mono-hierarchical structure where each element at level 2 or lower has exactly one parent.

Additional detail is provided with the ESCO occupation concepts, including one preferred term and any number of non-preferred terms and hidden terms in each of the ESCO languages. Each occupation also comes with an occupational profile. The profiles contain an explanation of the occupation in the form of description, scope note, and definition. Furthermore, they list the knowledge, skills and competences that experts considered relevant terminology for this occupation.

FIG. 2 is an illustrative classification of occupations. The classification may be similar to the International Standard Classification of Occupations (ISCO) classification. The illustrative example may classify jobs into a group according to the tasks and duties undertaken in the job.

The classification includes, for example, 10 major job groups, each with corresponding hierarchy levels. The main classification groups may include: Armed forces occupations (Group 0), Managers (Group 1), Professionals (Group 2), Technicians and associate professionals (Group 3), Clerical support workers (Group 4), Service and sales workers (Group 5), Skilled agricultural, forestry and fishery workers (Group 6), Craft and related trades workers (Group 7), Plant and machine operators and assemblers (Group 8), and Elementary occupations (Group 9).

Group 5 202 is provided for example, corresponding to "service and sales workers." The subgroups in Group 5 202 may also follow a corresponding numerical structure. For example, the ISCO code corresponding to the occupation "Market vendor" is "52111" 210, since it falls under the following structure (from narrower to broader): "Stall and market salesperson" (5211) 208, "Street and market salesperson" (521) 206, "Sales workers" (51) 204, and "Service and sales workers" (5) 202.

The subgroups in this classification follow the corresponding numerical structure. For example, the ISCO code corresponding to the occupation "Market vendor" is "52111", since it falls under the following structure (from narrower to broader): "Stall and market salesperson" (5211), "Street and market salesperson" (521), "Sales workers" (51), and "Service and sales workers" (5).

Additional datasets are available as well. The CH-ISCO-19 is a Swiss dataset, maintained by the Federal Statistical Office, containing 21,000 different job titles in German, French, and Italian, such as "Landwirtin", "Gärtner EFZ, Zierpflanzen Gärtner EFZ", or "Detailhandelsassistent EBA, Textilien." As in the ESCO dataset, the job titles are also classified according to ISCO. O*Net is another dataset that is maintained by the National Center for O*NET Development, on behalf of the U.S. Department of Labor, Employment and Training Administration (USDOL/ETA). O*Net contains, in a structure similar to ESCO, occupations, related skills, and a taxonomy.

Various technologies exist to facilitate automated job searching and matching candidates (with a given set of skills) to a job title that requires a certain set of skills. One of the problems with the existing technology relates to the inconsistent terminology used in the posting of job titles and/or job skills. Many of these entries may be manually entered by individuals and they may use different terminology for the same topic and the same terminology for different topics. This is particularly true with various online tools and social media sites.

Another problem relates to the data used to match individuals to new jobs. Existing solutions largely use manually set skill profiles, which are often outdated compared to the actual skills and experience of the individual. Manual skill reporting in existing technology also bears the risk of incorrect (over-or-underestimating) reporting of the skill level.

Another limitation is that the matching of skills of individuals to jobs and projects is done only using key phrases. Most existing technology does not put skills needed for a job or project into context or uses the skill group the skill originates from for detecting the scope.

Existing technology also rarely distinguishes between interest, actual skill/experience, and aspirations. This makes these solutions either less precise in matching individuals to jobs and projects, or it can hinder the professional development of an individual by neglecting the aspirations.

Another limitation is the lack of automatic mapping into a skill context in existing technology for (automatic) query resolution determination and allocation of expert resources. These technologies may detect relevant topics and the topic expertise of users but lack methods that put (where possible) topics into a skill context to potentially improve the allocation of expert resources.

As a result of these and other technical problems and limitations with existing technology, the job skills needed for a given job title may be difficult to discern, and further difficulties arise when existing technology is used to detect, based on interactions of the person with various data, if said person has these skills. This makes online and other technical solutions to automated job searching difficult.

SUMMARY OF THE INVENTION

The systems and methods described herein relate to creation and management of an ontology-based technology platform for jobs and skills, including a data structure of job titles and associated skills, and various technology-based processes for mapping skills to job titles and topics.

According to some aspects of the invention, a system and method are provided for preprocessing an ontology (e.g., an ontology of jobs and skills), mapping, associating and storing additional job titles to the ontology to enrich it, obtaining a set of skills based on a job title, mapping expertise topics to skills to generate expertise profiles for users, selecting the relevant parts of the ontology tree for a user and mapping user input job titles to actual job titles in the ontology.

In some examples, the mapping between the preferred label and one or more alternative labels as stored in a database (e.g., one of the databases described herein or other databases) can be removed. For example, the system may calculate a distance metric of these two labels (e.g., the preferred label and the alternative label) and determine the distance between the two terms. When the distance is greater than a threshold value, the alternative label may be removed from the list of alternative labels for a particular preferred label. This may also remove related skills and other information from the preferred label and future analysis.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIGS. 7-8 provide illustrative user interfaces for setting up a user profile, in accordance with embodiments of the application.

FIG. 11 provides illustrative user interfaces for setting up a user profile, in accordance with embodiments of the application.

FIG. 14 provides an illustrative user interface to provide a set of projects, in accordance with embodiments of the application.

FIG. 15 provides an illustrative user interface to applying for a project, in accordance with embodiments of the application.

The figures are not exhaustive and do not limit the present disclosure to the precise form disclosed.

DETAILED DESCRIPTION

Embodiments described herein include an ontology-based technology platform. For example, the ontology-based technology platform and job titles data structure can map job skills with job titles using advanced algorithms and novel data processing data structures and methods. Embodiments may also use natural language processing, machine learning and other technology tools to implement the systems and methods described herein.

Various technical advantages are realized by various embodiments of the invention, some of which are described throughout the application. For example, one of the technical advantages include a way to combine multiple datasets of job titles and skills and related features, to use machine learning techniques to enrich the combined data, and to merge these items into a single ontology. Another technical advancement is the combination of an ontology with automatically assessed, as well as manually reported, skills, experiences, and job titles into user profiles. Further advancements are made in the way the system automatically matches the skills and aspirations of users with the ones automatically and/or manually detected in new job listings and projects.

Figure 3:
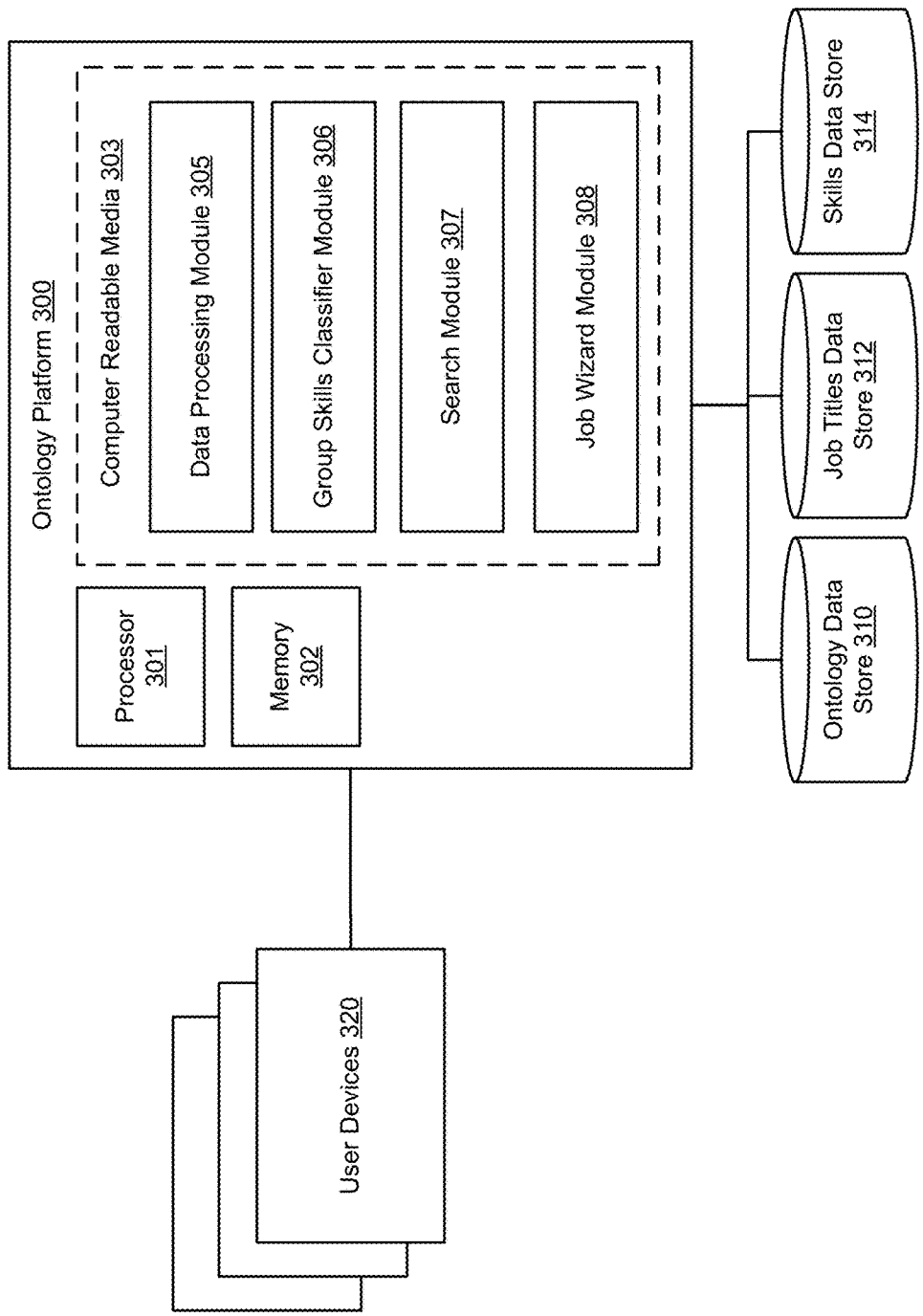
FIGS. 3-4 provide illustrations of an ontology-based technology platform, in accordance with embodiments of the application.

FIG. 3 depicts an example block diagram of an ontology-based technology platform and job titles data structure for mapping skills with job titles, in accordance with embodiments of the application. The system comprises ontology management platform 300. The ontology may comprise an ontology of jobs and skills. The ontology may be created based on a combination of the datasets (e.g., ESCO, CH-ISCO-19 and/or other datasets) and a thesaurus of job titles (e.g., the Thesaurus-of-Job-Titles), where skills are mapped to job titles following different approaches, including those described below.

Ontology platform 300 may comprise one or more processors 301, memory 302, and machine-readable storage medium 303 with one or more modules, including data processing module 305, group skills classifier module 306, search module 307, and job wizard module 308, with one or more data stores including ontology data store 310, job titles data store 312, and skill data store 314.

One or more processors 301 may be one or more central processing units (CPUs) or graphics processing units (GPUs), semiconductor-based microprocessors, and/or other hardware devices suitable for retrieval and execution of instructions stored in machine-readable storage medium 303. Processor 301 may fetch, decode, and execute instructions to control processes or operations for optimizing the system during run-time. As an alternative or in addition to retrieving and executing instructions, processors 301 may include one or more electronic circuits that include electronic components for performing the functionality of one or more instructions, such as a field programmable gate array (FPGA), application specific integrated circuit (ASIC), or other electronic circuits.

Computer readable media 303 may be any electronic, magnetic, optical, or other physical storage device that contains or stores executable instructions. Thus, machine-readable storage medium 303 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 303 may be a non-transitory storage medium, where the term "non-transitory" does not encompass transitory propagating signals. As described in detail below, machine-readable storage medium 303 may be encoded with executable instructions.

Data processing module 305 may perform pre-processing and cleaning operations on skills and job titles. Illustrative pre-processing and cleaning operations performed by data processing module 305 are provided with FIG. 6.

In some examples, data processing module 305 may implement a filter while performing pre-processing and cleaning operations on skills and job titles. For example, the data set may include one or more labels for occupations (e.g., "airport director" with an alternative label "financial director"). The process may determine a vector representation of each occupation and each alternative label using one or more embedding models (e.g., the Universal-Sentence-Encoder, etc.).

For a given occupation, data processing module 305 may determine the vector distance (e.g. cosine distance, cosine similarity, etc.) of each alternative label to the preferred label of the occupation. If the vector distance is larger than a predefined threshold value, the alternative label may be removed from the list of alternative labels of this occupation. The filter method may be applied on all occupation entries in all languages.

As an illustrative example, the occupation "airport director" has a preferred label of "airport director." It may also correspond with a list of alternative labels, including "financial director" as one such alternative label. In a plain language reading of these two labels, they may appear unrelated, but erroneously listed as related in the data set. Similarly, the computed vector distance (e.g., cosine distance) between these two labels is 0.7. When the predetermined threshold value is set to 0.6, the vector distance may exceed the threshold value. Since the vector distance exceeds the threshold value, data processing module 305 may remove the alternative label of "financial director" from the list of alternative labels for the preferred label "airport director."

When using a cosine similarity rather than a cosine distance, the vector distance may be compared to a predetermined threshold value. When the cosine similarity is lower than the predetermined threshold value, the alternative label may be removed from the list of alternative labels for the particular preferred label.

The filtering method (implemented by data processing module 305) can also be configured to have an extra step regarding abbreviations (e.g., if an occupation label contains an abbreviation. In part, this is based on the inventors' recognition that the vector representations are often imprecise if a label contains an abbreviation (since they are ambiguous). Thus, the filtering method may be configured with an additional feature to handle (preferred/alternative) labels differently if at least one abbreviation is detected. As part of this method, the filter is configured such that no alternative labels are filtered for entries where the preferred label contains an abbreviation (i.e., the entry stays the same with its preferred and all alternative labels). For entries where the preferred label has no abbreviation but an alternative label has one, this alternative label will not be filtered.

In the various scenarios described, when abbreviations are included, the filtering method may identify all-uppercase words (e.g., of length greater than 1 or some other number of characters) in preferred or alternative occupation labels and generate a subset of these labels. The subset of labels may correspond with labels that include potentially abbreviated terms. In some examples, the filtering may be implemented to result in the subset of labels not including alternative labels where the preferred label contains an abbreviation. In this instance, the label may remain the same with a preferred label and all alternative labels. For entries where the preferred label has no abbreviation but an alternative label has one, this alternative label may not be filtered.

Group skills classifier module 306 may create and maintain one or more data structures comprising a multilingual classification of skills, competences, qualifications and/or occupations. Examples of datasets of skills, competences, qualifications, and/or occupations are ESCO and ISCO. Other skills, competences, qualifications and occupations datasets and/or combinations thereof may also be used to provide base data. Additions to the base data may be implemented by embodiments described herein.

Search module 307 may receive a query and search matching occupations. The query may include one or multiple job titles obtained from the preprocessing and cleaning steps implemented by data processing module 305. Illustrative search operations performed by search module 307 are provided with FIG. 6.

Job wizard module 308 may process the job titles into the job titles data store 312. The job titles in this dataset may also contain the job title/professional degrees such as "EBA" (Federal Professional Certificate) or "EFZ" (Federal Certificate of Proficiency). The system processes this list of job titles, such that it considers multiple gender inflections, and also job titles with and without their degree level in a predetermined format (e.g., following the format presented in the ESCO dataset).

The job titles may correspond with a preferred label and/or alternative label. The preferred label may be an original form of the job title and/or include a qualifier. Some examples of qualifiers are 'senior', 'junior', or 'external'. The alternative label may correspond with an alternative name of the job. The alternative label may be without qualifiers and/or contain the same list of alternative labels, but each list entry has its qualifiers(s) removed. Other label criteria for preferred label and/or alternative labels may be used.

The preferred label of relevant job titles may be represented with both male and female inflections, separated with slash if they differ (e.g., waiter/waitress). Job wizard module 308 may process the titles to generate a list of possible alternative labels: For example, job titles without additional information (typically to indicate higher specialization, not considered a role modifier) in parenthesis (e.g. "textile washer" from "textile washer (finishing)," or a job title without the job specific degree level or certificate, if one exists (e.g. "Gardener" from "Gardener EFZ", and 'EFZ' being a type of certificate), or a job title without specific information, which is usually followed by a comma (e.g. "Gardener" from "Gardener, Ornamental Gardener." The job wizard module may also remove role modifiers, for example 'lead' in 'lead developer', if any are present, to create an additional alternative label.

Ontology data store 310 may comprise thousands of different occupations in various languages, including information from the ESCO and ISCO datasets and thesaurus of job titles dataset. Each occupation may correspond with a preferred label and a list of alternative labels, if any. In some examples, occupations may be classified according to the International Standard Classification of Occupations (ISCO) or other classification standards.

Ontology data store 310 may also be updated with the data cleaning process discussed herein. For example, data processing module 305 may store a vector representation of each occupation and each of their alternative labels in ontology data store 310. When the computed vector distance between the preferred label and the alternative label exceeds a threshold value, the alternative label may be removed from ontology data store 310 for this occupation.

Ontology data store 310 may also include a mapping of job titles with their corresponding skills. Ontology platform 300 enhances this data by assigning skills to a new given job title (e.g., determined by the processes described below) for which the ISCO group to which it belongs can be ascertained.

Ontology data store 310 may comprise the skills, competences, qualifications and/or occupations dataset organized in an ontology with several hierarchical layers to enable skills to be grouped into skill groups/categories. These groups may further be grouped into higher level groups and so on. Each skill group may also have a name describing its broad concept. On the very top of this ontology tree are only a handful of nodes, each covering a very broad set of skills.

For example, the highest level may only contain the groups with names 'skills', 'knowledge', and 'attitudes and values'. A skill like 'perform data analysis' may be connected to its next higher skill group 'managing and analyzing digital data', this is again connected to the even broader skill group 'accessing and analyzing digital data', and so on, until it reaches the top of the ontology tree, in this case 'skills'.

The following is an example of a skills hierarchy:
Skills
  Working with computers
    Accessing and analyzing digital data
      Managing and analyzing digital data
        Perform data analysis Job titles data store 312 may comprise information associated with a job title, including a degree level or professional certificate needed to hold the job title. A preferred label and alternative label may also be stored. An example of such a data structure for job titles and additional information is the following list of fields: ID, ISCO group, preferred label, alternative labels, language, description, connected skills.

However, the foregoing is for example only and the invention is not so limited.

One or more user devices 320 may interact with ontology platform 300. The user devices 320 may include Web-based platforms, mobile platforms, and similar platforms. The interactions may allow users to view and/or be notified of new opportunities. The interactions may allow users to edit their profiles and aspirations, The interactions may allow users to view high-level skill analyses of users, user groups, entire departments, and similar groups. The interactions may allow users to add future projects and compare the needed skills vs. the ones currently available in the organization.

Figure 1:
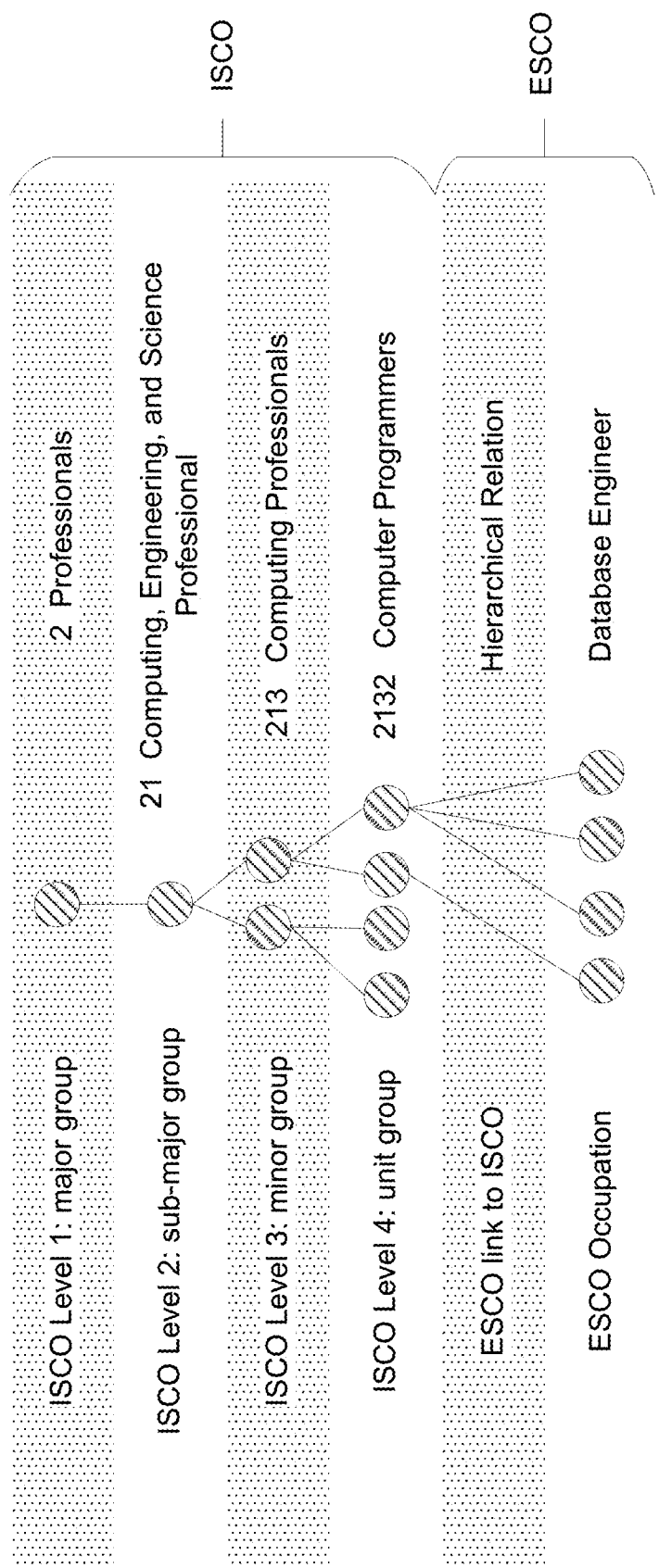
FIGS. 1-2 are illustrative classifications of occupations.
Figure 2:
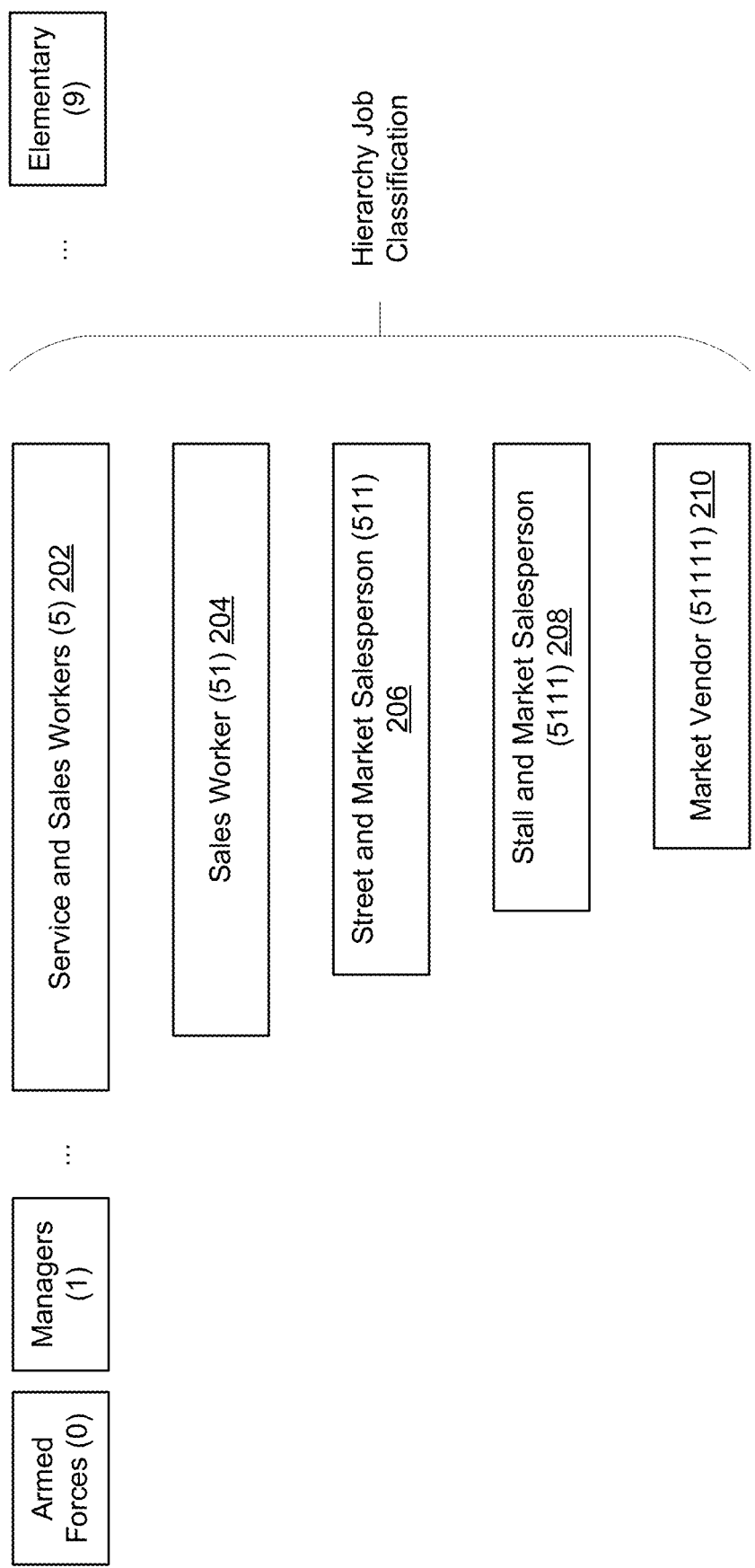

Ontology platform 300 may implement algorithms to map job titles to skills. For example, job titles data store 312 and skills data store 314 comprise a set of job titles and their corresponding skills, where the jobs are classified according to the ISCO classifications, as illustrated with FIGS. 1-2. Thus, ontology platform 300 can determine a corresponding mapping between ISCO groups and skills and assign skills to a newly identified job title for which the ISCO group to which it belongs can be determined.

According to one aspect of the invention, ontology platform 300 can obtain the most common skills from the ontology under each ISCO group. Most common skills is defined as skills that are connected to at least a certain percentage (a threshold parameter of the system) of occupations within an ISCO group in case of a most granular ISCO group (e.g. 4 digit ISCO group). E.g., such a threshold could be 80% (or other threshold), hence skills that are connected to at least 80% of the occupations within a 4 digit ISCO group are considered common skills of this ISCO group. In the case of broader ISCO groups, for example 3-digit ISCO groups, the threshold parameter is applied onto all common skills of the sub-groups of this ISCO group. E.g., if 80% of all ISCO sub-groups contain a skill in their common skill list it is also considered a common skill for the broader ISCO group. For example, if a skill of occupation '52111' (Market vendor) is present in at least, e.g., 80% of all occupations of its ISCO group '5211' (Stall and market salesperson), it is considered a common skill of this ISCO group. Likewise, for the even broader ISCO group, '521' (Street and market salesperson), if a common skill of '5211' (Stall and market salesperson) is also present in the common skill list of, e.g., 80% of all other sub-groups it is also considered a common skill of '521' (Street and market salesperson). Given a new job title with its corresponding ISCO group, ontology platform 300 assigns the common skills of the ISCO group.

To be able to determine skills for any given job title, ontology platform 300 may train an ISCO group classifier. For training of this classifier the occupations/job titles that have an assigned ISCO group in the ontology are used together with their ISCO group to create a dataset. Each job title in this dataset is encoded into a multi-dimensional (e.g. 512 dimensions) vector embedding. This embedding is obtained using a pretrained multilingual model (e.g., the Universal Sentence Encoder), such that for every job title in the dataset a vector representation is present. This dataset of embedding vectors and their corresponding ISCO group labels is then split into training and test dataset, whereas the entries are assigned randomly to train or test. The assignment probability for training is higher, such that the training dataset is larger than the test set. A classifier is then trained on the training data, with the embedding vectors being the input and the ISCO group prediction being the output. Such a classifier may be a neural network, or some other suitable machine learning model.

The classifier may have multiple outputs, for example for each ISCO group level. E.g., the first output predicts which highest level ISCO group (0-9) the job title belongs to, the second output to which two-digit ISCO group the job title belongs to, and so on. The performance of the trained classifier is then assessed using the test set.

The trained classifier may be further calibrated, e.g., using a technique like temperature scaling, such that the classifier outputs calibrated confidence values for its predictions. These confidence values may be used for thresholding which output to use. For example, the classifier might predict, given the vector representation of a job title as input, '5211' (Stall and market salesperson) as 4-digit ISCO group output but with a low confidence value. If this confidence is below a predefined threshold, the confidence of next higher-level output is checked. For example, the 3-digit output predicts '521' (Street and market salesperson) with a confidence above the predefined threshold. In this case the classifier assigns the 3-digit ISCO group to this job title. When selecting the appropriate output using this thresholding, the classifier may begin at the most fine-grained (e.g., 4-digit ISCO group) output, and iteratively goes to broader outputs if the confidence at the output does not reach the threshold. If no output reaches the confidence threshold no ISCO group is assigned to the job title.

Ontology platform 300 may split the mapped skills and job title data into training, development and testing datasets, and use the data to train a Neural Network model to determine or classify synonyms and alternative terms of job titles. The input features are multi-dimension (e.g., 512) embeddings obtained using a multilingual model (e.g., from the Universal Sentence Encoder.

Once trained, the classifier of ontology platform 300 may be used to classify the job titles from a thesaurus of job titles (e.g., the Thesaurus-of-Job-Titles) to determine synonyms and alternative terms used for the job titles stored with job titles data store 312. In some examples, the synonyms and alternative terms may be stored with their corresponding ISCO group and matched with job titles already stored with job titles data store 312. The trained classifier may be also used to classify job titles from other data sources, for example direct user input.

Figure 4:
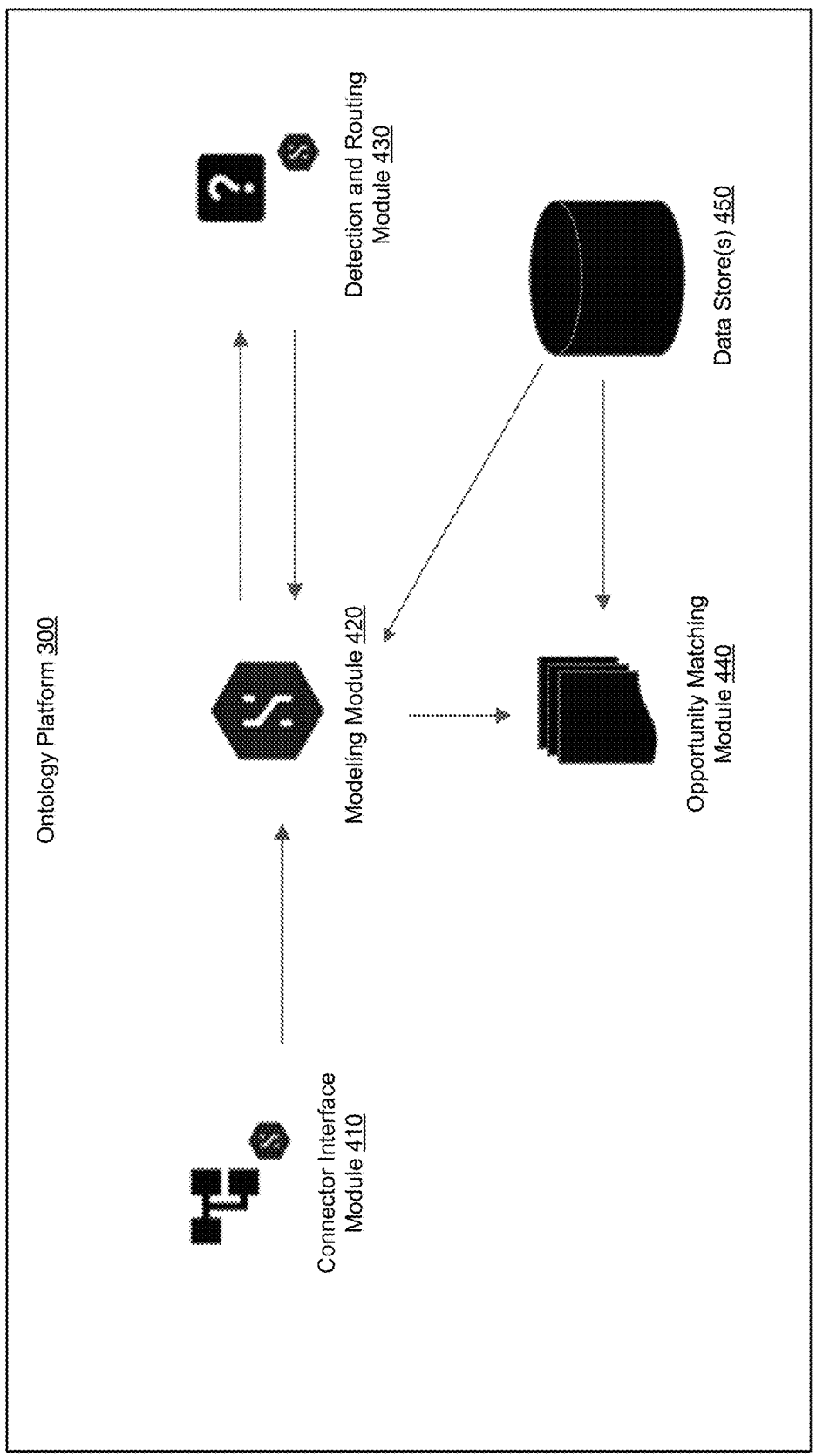

FIG. 4 depicts another example ontology platform 300, in accordance with embodiments of the application. Ontology platform 300 may include connector interface 410, modeling module 420, detection and routing module 430, opportunity matching module 440, and one or more data stores 450. For example, the data stores 450 may include the ontology data store 310, job titles data store 312, and skill data store 314 of FIG. 3.

Connector interface 410 provides interfaces to data sources that contain data relevant for user skill detection. This may include collaboration platforms, Q&A tools, chat tools, calendar, human resource (HR) databases, and/or other data sources.

Modeling module 420 is configured to ingest skill data for use with other modules. Modeling module 420 may combine all data into a single expertise model.

Another aspect of ontology platform 300 relates to job title matching and skill association. A goal of the job title matching and skill association process is to be able to assign relevant skills to users, based (solely or primarily) on the knowledge of their job title. This is especially useful for users for which ontology platform 300 does not have any other information, for example because they never interacted with the system and with whom the system has no associated external data. The associated skills are then ingested in modeling module 420 where they may be directly useful in ontology platform 300 for other practical applications. By way of example, one such application is a system for mapping and identifying expert resources as described for example in U.S. Pat. No. 10,223,646 entitled "Machine Learning Approach For Query Resolution Via A Dynamic Determination And Allocation Of Expert Resources", which is incorporated herein by reference in its entirety. Other practical applications may include the propagation of the determined skills for a user to other systems, such as human resource management platforms, staffing systems, and others.

Additionally, a user profile may be updated (e.g., populated with these skills) to include the skills mapped to the user. The profile is a list of the most relevant topics a user interacts with, and each entry has also an expertise score that reflects how strong a user is connected to this topic based on past interactions with it, and in relation to all the other users of the system. The profile, which contains the topics a user interacts with determined by the expertise mapping system, can be enriched with skills the user is connected to by adding the skills to the profile and setting an expertise score. The initial expertise score is higher for skills that are determined, by the ontology, to be essential for the occupation (determined via the user's job title and matched to the occupation in the ontology) and lower for skills that are determined to be optional for the occupation. The profile may also be enriched with skills that originate from mapping topics in the profile to skills in the ontology. Skills added to profile from this path may have a different initial expertise score compared to the ones determined by the occupation to skill association.

Modeling module 420 is configured to combine all data from data store 450 into a single expertise model. This combination of data may help learn "who knows what" more completely and accurately. The data may combine, for example, questions, answers, recommendations, calendar data (e.g., who attends meetings on certain topics, etc.), chat messages or discussions (e.g., from third party messaging applications, etc.), HR data (e.g., resumes or CVs, job titles, job descriptions, etc.), and project descriptions (e.g., who is involved in certain projects, etc.).

Detection and routing module 430 is configured to provide a question and answer platform with automatic expert detection and question routing.

Opportunity matching module 440 is configured to match user skills and aspirations to jobs and projects. The job title matching may use features of the search functions from Elasticsearch or other search algorithms, combined with some custom preprocessing and cleaning steps in order to map the user's job title to an occupation in the ontology of jobs and skills described herein. Additional search functions may be implemented, such as automatic translation of search queries to facilitate search in multiple languages simultaneously, or fuzzy matching of search queries that handles small typos in a smart way (e.g., detects that 'wifi' and 'wiki' do not match), or search of similar entries using a word or sentence embedding vector space, or search methods using a synonym lookup table, or any combination of the aforementioned functions.

Figure 5:
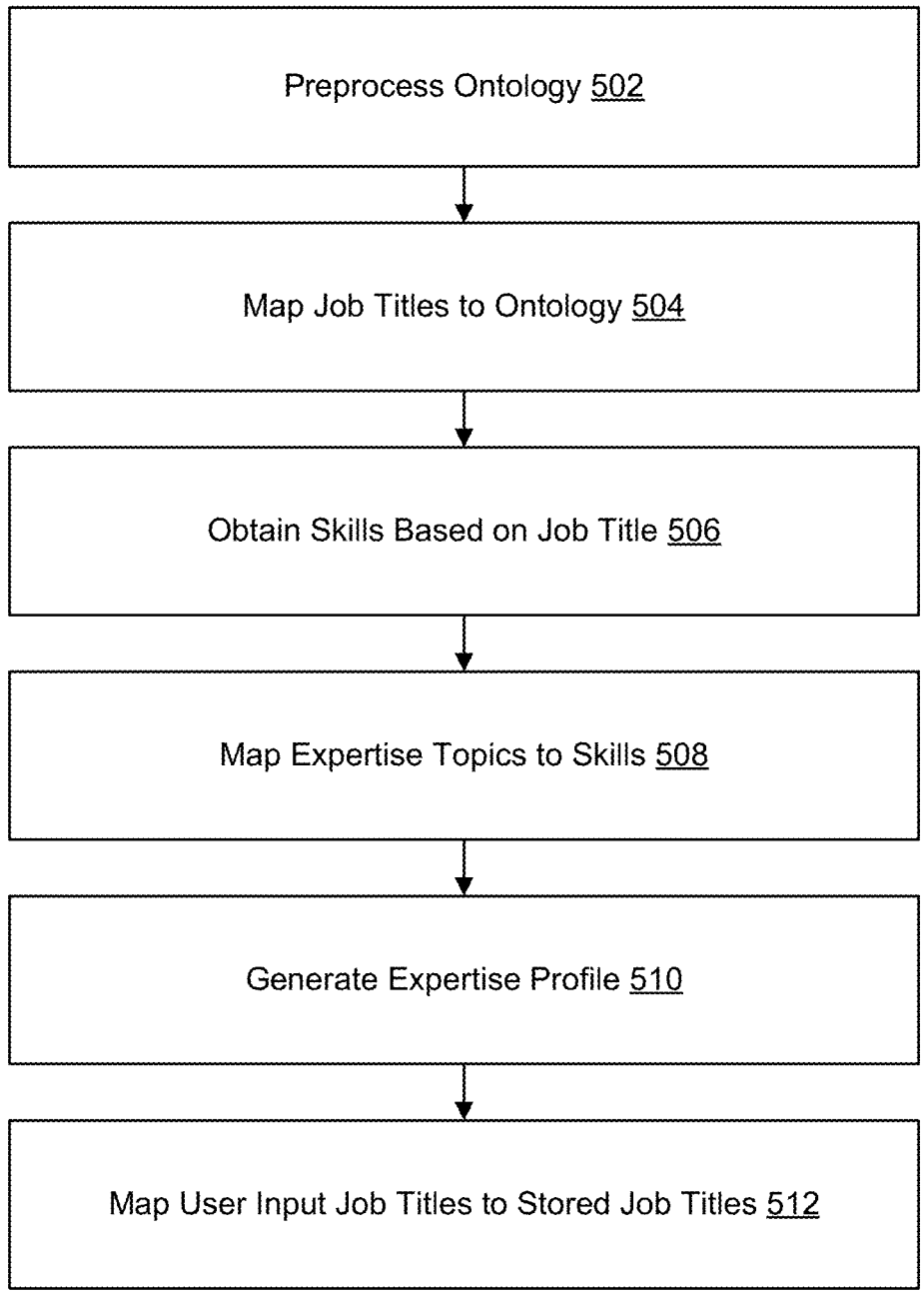
FIG. 5 depicts an example of a flow chart for a method of mapping skills with job titles, in accordance with embodiments of the application.

FIG. 5 depicts an example of a flow chart for a method of mapping skills with job titles, in accordance with embodiments of the application. The method may be performed by the ontology-based technology platform of FIG. 3.

At 502, the method may include preprocessing an ontology (e.g., an ontology of jobs and skills). The preprocessing may include one or more of the steps in FIG. 6, including for example qualifier removal, job splitting, and/or job cleaning, among other steps.

At 504, the method may map additional job titles to the ontology. This may help enrich the ontology. Given a query containing multiple job titles obtained from the preprocessing and cleaning steps, the Elasticsearch search API may be used to search matching occupations in the ontology. The search may use a set of fields in a particular order. For example, the following fields may be used in this order of relevance:

1. Preferred label
2. Alternative labels
3. Preferred label with qualifier removed
4. Alternative labels with qualifier removed
5. Hidden labels The preferred and alternative labels with qualifier removed may be obtained from the preprocessing steps. The relevance of these fields may be used in Elasticsearch by applying different boosting. This way, a job title matching the preferred label will be favored over another matching just one of the alternative labels. The algorithm may also implement a language filter, to enable matching of occupations only in a specific language, if desired.

After matching a job title to an occupation in the ontology, the method may obtain a set of skills based on a job title (506). For a given occupation, the ontology provides essential and optional skills, depending on the relevance to the occupation. The algorithm takes this relevance into account when connecting the user's expertise to skills, building stronger connections to essential skills.

At 508, the method may map expertise topics to skills. This may help generate expertise profiles for users (e.g., based on their interactions with topics from different data sources as detailed below).

At 510, the method may select the relevant parts of the ontology tree for a user.

At 512, the method may map user input job titles to actual job titles in the ontology.

Figure 6:
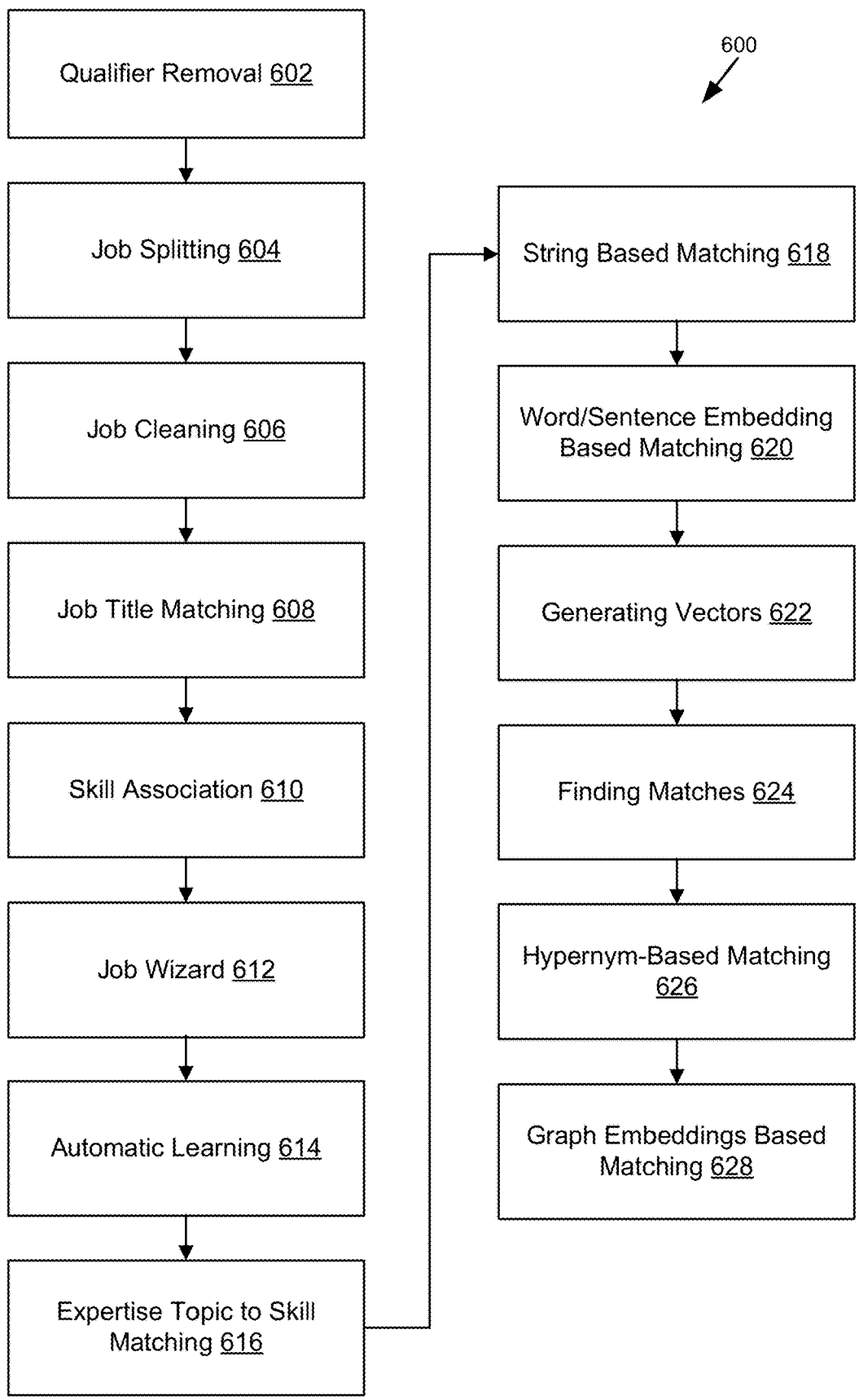
FIG. 6 depicts an example of a flow chart for a method of pre-processing and cleaning skills and job titles, in accordance with embodiments of the application.

FIG. 6 depicts an example of a flow chart for a method of pre-processing and cleaning skills and job titles, in accordance with embodiments of the application. The method may be performed by the ontology-based technology platform of FIG. 3.

At 602, the method may perform qualifier removal. For example, one of the cleaning steps may include removal of at least certain job title qualifiers. Qualifiers may be used to describe the level of a job (e.g., the qualifier "senior" in "senior data scientist"). The occupations in the ontology may not contain those qualifiers, and therefore it may be desirable to remove them from the job title in a preprocessing step. This way, for example, senior data scientist, data scientist and external data scientist are all represented as the same occupation in data scientist.

The qualifier removal algorithm may be configured to normalize these differences by tokenizing and stripping the qualifiers in the job title. Those qualifiers that are taken into account typically come from a manually curated list. For German, which is a language rich in compounds, the algorithm is able to remove qualifiers as part of the compound.

At 604, the method may perform job splitting. For example, job titles may be a combination of multiple positions, such as "Data Scientist & Software Engineer." To be able to map them in the ontology, ontology platform 300 may pre-process the job title and store "data scientist" and "software engineer" individually. Therefore, the algorithm is configured to map the positions of "Data Scientist" and "Software Engineer" independently, from the job title "Data Scientist & Software Engineer."

At 606, the method may perform job cleaning. For example, job titles may contain additional information, such as a level, tier, or other details. For example, "Software Engineer (Scala)" or "Software Engineer III." The cleaning step removes "Scala" and "µl" from the job title.

At 608, the method may perform job title matching. For example, a search algorithm (e.g., the Elasticsearch search API) may be used to search matching occupations. The query may contain multiple job titles obtained from the preprocessing and cleaning steps described above.

For the search, a set of fields may be used. In some examples, the set of fields may be used in the following order of relevance: Preferred labels, Alternative labels, Preferred label with qualifier removed, Alternative labels with qualifier removed, and/or Hidden labels. The Preferred and Alternative labels with qualifier removed may be obtained from the preprocessing step described above. Other orderings and rules may be used.

The relevance of these fields may be used in the search algorithm (e.g., Elasticsearch) by applying different boosting. This way, a job title matching the preferred label can be favored over another matching just one of the alternative labels. The algorithm may also implement a language filter to match occupations (e.g., in a specific language).

At 610, the method may perform skill association. For example, the skills and occupations from the ontology are stored in independent indices as part of the search algorithm. After matching a job title to an occupation in the ontology, ontology platform 300 can retrieve the skills associated with the job title. For a given occupation, the ontology provides essential and optional skills, depending on the relevance to the occupation. Ontology platform 300 may take this relevance into account when connecting the user's expertise to skills, building stronger connections to essential skills. The following use cases show examples of how the algorithm builds those connections.

One use case is: a user changes the job title, the algorithm matches the job title to the ontology and subsequently retrieves the essential and optional skills of this occupation. The algorithm then proceeds and connects the user to the skills, initializing a stronger connection to the essential skills than the optional ones. In some implementations, the algorithm may further boost existing connections of the user to expertise topics that can be mapped to essential and optional skills of the new occupation.

Another use case is the mapping of common skills of peers of the user to the user. In some implementations, users within the same organization that have the same job title are considered peers. The algorithm then analyses the common skills of these peers and checks which skills are not connected to this job title/occupation in the ontology. The algorithm then connects the user to these additional peer-common skills. In another or additional version of this use case the algorithm considers users within the same department or work group peers, and then proceeds with the common skill analysis and mapping as described for the first version.

At 612, the method may implement a job wizard. For example, ontology platform 300 implements a job wizard that allows new users to introduce their job title. It then suggests a sample of skills associated with those job titles based on the skills that exist in the ontology. The user is then able to select those skills that best match with them. The modeling module 420 then learns to associate the expertise of the user with the selected skills.

At 614, the method may implement automatic learning. For example, the algorithm may automatically learn the skills connected to a user, based on the job title. This way, when a user changes the job title, their expertise will be updated with the skills associated with this new job title. This may be done by matching the user's job title to the job titles in the ontology. If no match is found, the algorithm will try to predict the ISCO category the job title belongs to using a pretrained model. If the confidence value of the prediction is above the confidence threshold the predicted ISCO group is used for further processing: the algorithm connects the user to the most common skills of the predicted ISCO category.

At 616, the method may perform expertise topic to skill matching. For example, the algorithm generates expertise profiles for users based on their interactions with topics from different data sources. For this, the algorithm retrieves, for a given user, a list of expertise topics and their expertise scores. For retrieval of this list, the algorithm may connect to a system for mapping and identifying expert resources as described for example in U.S. Pat. No. 10,223,646 entitled "Machine Learning Approach For Query Resolution Via A Dynamic Determination And Allocation Of Expert Resources". Such a system may be connected to a plurality of other systems to retrieve data the user interacts with, for example chat systems, document editing and management platforms, support ticket systems, question and answer platforms, and others. From this data the system extracts the relevant topics and connects the user to these topics. For this, the system may use methods as described for example in U.S. Pat. No. 10,878,174 entitled "Advanced text tagging using key phrase extraction and key phrase generation" which is incorporated herein by reference in its entirety. Based on the interactions the user has with these topics over time and in relation to interactions of other users of the system, the system calculates an expertise score for every topic for this user. The algorithm then tries to match the retrieved expertise topics to skills in the ontology. In some implementations, the algorithm may send the matched skills back to the system, such that the matched skills are also used in the allocation of expert resources and other functions of the system.

Therefore, the algorithm implements a topic to skill matching to be able to find the corresponding skills in the ontology, and associate them with the user. This also enables generating high level skill category profiles for the user, because the ontology provides a mapping of the matched skills to higher skill categories up the ontology tree.

An example of such a process is: a user creates a document containing a plurality of topics. The system for mapping and identifying expert resources detects this, extracts the relevant topics from this document, connects the user with the extracted topics and assigns an expertise score for the user for each of the extracted topics. At 616 the method retrieves this expertise topic list for this user and maps, where possible, the topics to skills in the ontology. The mapped skills can then, via the ontology, be used to retrieve the skill groups they belong to, to generate a high level skill group analysis of the user.

In some examples, the topics may be mapped to skills from the ontology. Other approaches and combinations of approaches may be used.

At 618, the method may perform string-based matching. For example, skills in the ontology may be represented by different forms, including a preferred label or an alternative label. In the string based matching approach, the algorithm matches topics to those field labels. When multiple skills are matched given the same topic, the algorithm computes a relevance score to determine which skill, if any, best fits with the topic. This score is computed from the fields matched for a given skill, so that skills where the preferred label matches are more relevant than those matching one of their alternative labels.

In some examples, fields can be matched in different ways in the following order of relevance: exact match (e.g., the topic exactly matches the label in the field), case insensitive matching, or substring matching (e.g., a substring of the field label is matched).

At 620, the method may perform word/sentence embedding based matching.

For example, the mapping of topics to skills in the ontology may use word/sentence embeddings. These are vector representations of those words and sentences in a vector space. For this, the algorithm uses a pretrained multilingual embedding model to get embedding vectors of skills and topics, which consist of either single words or sentences.

The algorithm may match topics to skills if their vector representations are similar, which is determined, for example, by calculating the cosine similarity or distance in the embedding space. The algorithm then uses a threshold to determine whether the similarity is high enough (or the distance is short enough in case of the distance metric) for a match.

At 622, the method may generate vectors. For example, the embedding vector is generated from the skill label itself, the alternative labels, a description text of the skill, or any combination of these. From topics: the embedding vector is generated from the topic label, one or multiple context texts from which the topic was extracted, co-occurring topics, hypernyms, or any combination of these.

At 624, the method may find matches. For example, the vector representations of the skills in the ontology are loaded into a vector space index. The algorithm then matches the vector representation of a topic with a skill that is similar. To do so, it searches in the index for the nearest neighbors of the topic vector, which represent the most similar skill vectors. If the distance to a neighbor (hence a skill) is shorter than a specific threshold, it is chosen as a match candidate for the topic. Such distance metric can be, for example, the cosine distance. This thresholding may be one of the first steps in selecting relevant skills.

An alternative version of the method may apply additional filtering on match candidates: the method calculates the distances of the topic vector to the vectors of all labels (including aliases, alternative labels, etc.) of the candidate. All these distances are then used to calculate a power mean of the distance using a predefined exponent as parameter for the power mean. The power mean can then be used for further thresholding of which candidates get selected.

Topics may include abbreviations, which are often a sequence of upper-case letters. After selecting match candidates using the distance metric, the algorithm may perform an additional filtering step. It may check (case-insensitive) if the string representation of the topic is an abbreviation and if it does not find the exact string as an individual token within the string representation of the match candidate skill, it does not further consider it a candidate. For example, topic string 'NPS' is found in skill string 'NPS Score', but not in skill string 'NPSM', since it is not an individual token of the string. In some cases, topics shorter than a certain number of characters (e.g., 5 or some other number) may be treated as abbreviations.

Other methods to detect and match abbreviations could also be used. This checking for abbreviations step is helpful, since distance metrics might give false matches for different abbreviations.

Multiple topics may match a skill, and each of these match candidates has a value for the match quality. Furthermore, each topic has, per user, an expert score describing how strong a user is connected to this topic at a specific point in time, based on past interactions with the topic.

As a next step of candidate selection, both of these features are combined. The algorithm may multiply the score of the topic-skill match with the expertise score to get a combined score. This combined score is added to the existing skill score (0 in the beginning), to get the new skill score. Multiple topics may match to the same skill, and all of these matches contribute via their combined score to the skill score.

If a skill has a non-zero skill score it will propagate this value up the skill ontology to its parent skill category and add the skill score to the skill score of this parent skill category (0 in the beginning). Subsequently, this skill category will propagate its skill score in the same way to its parent skill category, and so on until the top of the ontology tree.

When this process has finished for a given user profile with all its topics, the algorithm can filter the ontology tree nodes (skill, skill categories) for nodes with non-zero skill scores to get all skills and skill categories that may be relevant for this user.

The algorithm may directly use this sub-tree of the ontology (all nodes with non-zero skill score) directly as a relevant skill tree for the user, or may do additional filtering, for example on the skill score, or by level of hierarchy (level in the ontology tree).

In some examples, more advanced match selection could be achieved for example by, first, scoring not only the distance between a topic and a skill, but also on the parent skill category(ies) of this skill, or siblings in the same skill category(ies), or by scoring against skill categories even further levels up the ontology tree. Second, a dynamic skill score thresholding may be based on whether the skill/skill group is associated with the job title a user has. This skill to job title association is given by the ontology.

In some examples, more advanced ways to select the relevant sub-tree of the ontology for a given user are possible, for example by dynamically selecting different levels of the ontology tree given how much evidence the algorithm can gather (based on various scores etc.) that a given tree node (skill or skill category) is relevant for a user. For some parts of the tree, the algorithm may only select very granular skill details, for other tree parts broader concepts/skill groups, for example because a user covers all skills in these skill groups.

At 626, the method may implement hypernym based matching. For example, the hypernym based matching approach allows the algorithm to match hypernyms (direct or transitive) of a given topic to skills in the ontology. Those hypernyms are obtained from a hypernym database. Similarly to the string based matching approach, the matched skills are then associated with the topic, building stronger connections with direct hypernyms.

At 628, the method may implement graph embeddings based matching. For example, besides the standard word/sentence embeddings mentioned above, another type of embeddings one can use are graph embeddings, or a combination of graph and sentence embeddings. These combined embeddings are a representation of the skill in an embedding space that preserves the hierarchical structure of the ontology. The vector representation of a topic can be then placed within the graph embedding space of the ontology. This allows the algorithm to retrieve its neighboring skills, which are the most similar skills to the given topic, similarly to the word/sentence based matching approach. The difference is that not only the contextual similarity of the label is used as in the sentence embeddings, but also the granularity, hierarchy level, and the scope of the skills and skill categories in the ontology.

Figure 7:
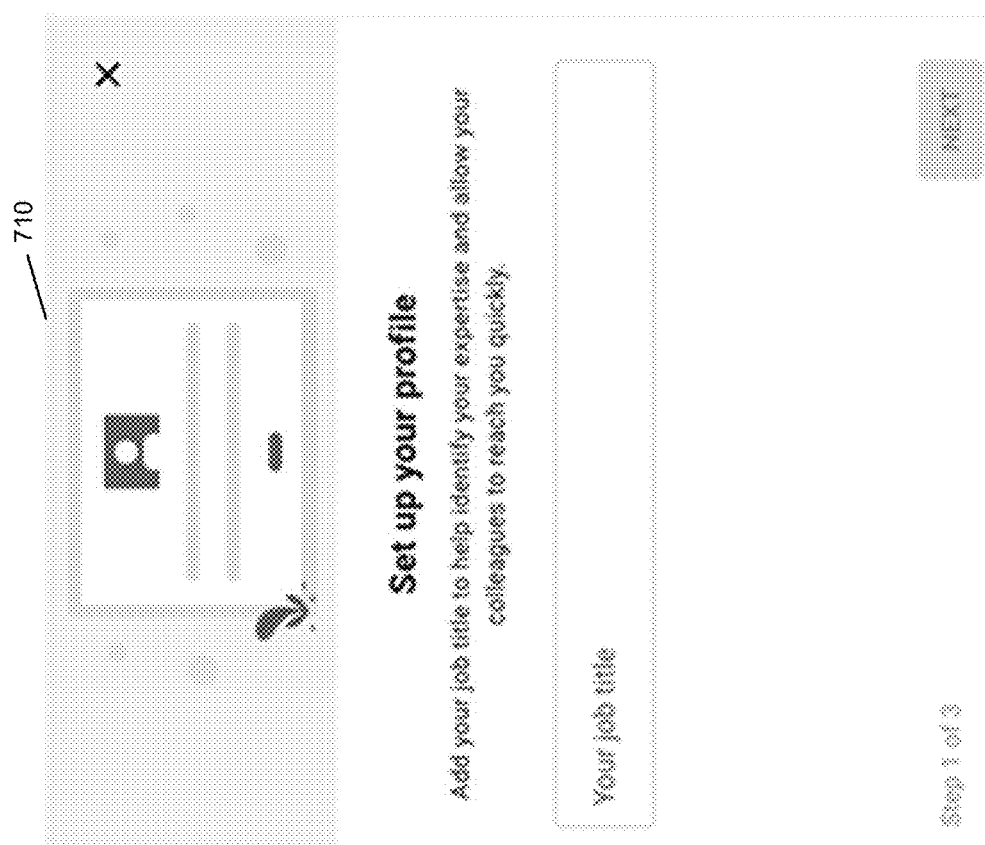

FIG. 7-8 provide illustrative user interfaces for setting up a user profile, in accordance with embodiments of the application. For example, a user may access user interface 710 of FIG. 7 and add a job title to a search tool that generates a search query. If a portion of the job title is found in the ontology, the matching job titles are returned to user interface 810 of FIG. 8. The user may select one of the returned job titles in user interface 820 of FIG. 8. The job title may be added to a user profile.

Figure 9:
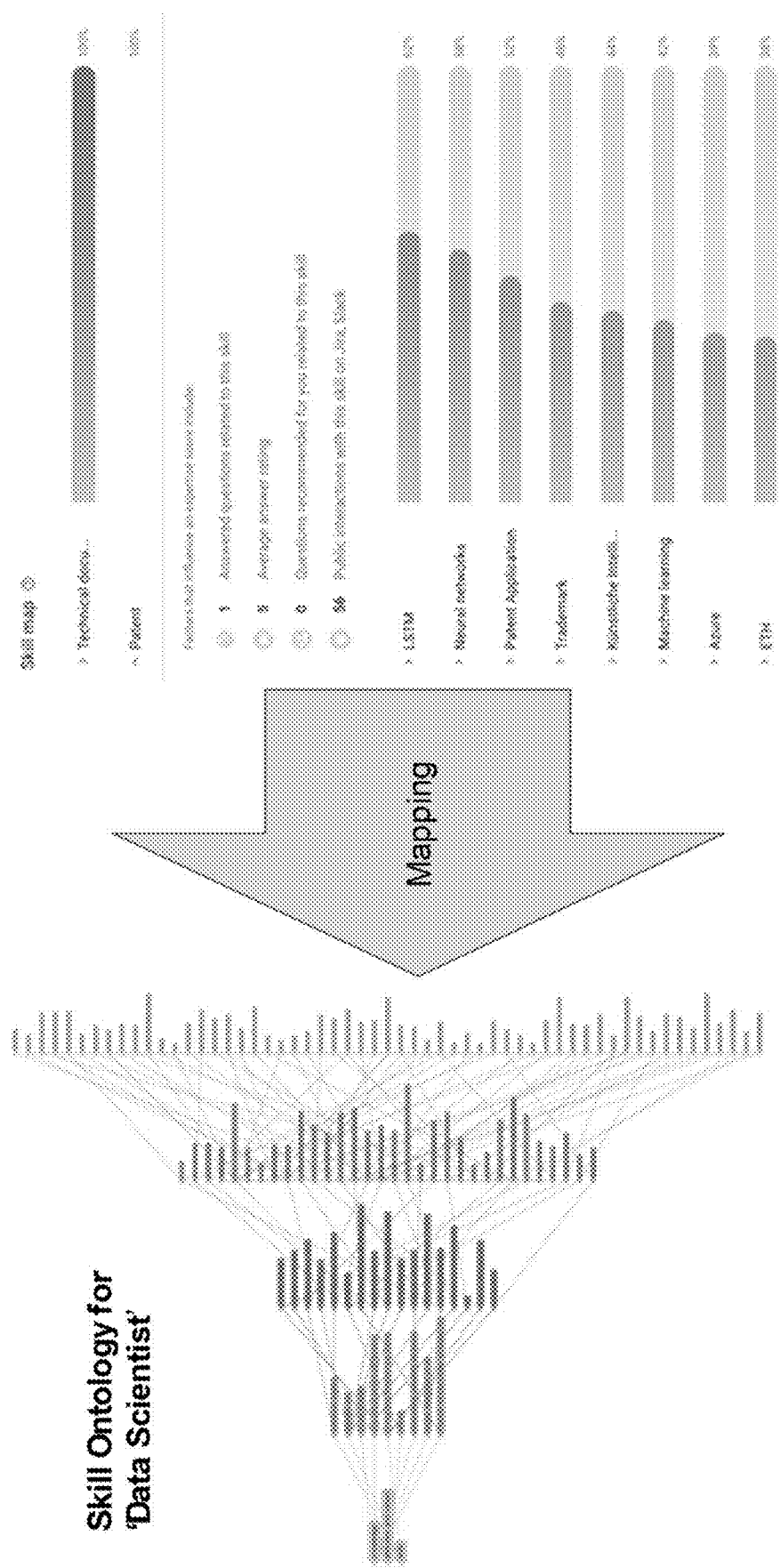
FIG. 9 provides an illustrative skill ontology, in accordance with embodiments of the application.

FIG. 9 provides an illustrative skill ontology, in accordance with embodiments of the application. For example, ontology platform 300 may map the skill map to the skill ontology for a particular skill ontology like "data scientist." The skill map may identify a set of skills that relate to a particular job title, (e.g., including skills related to data science) and/or technical documents related to the skills of the user (e.g., technical documents, patents, trademarks, etc.). The skill map may be mapped to a skill ontology based on the set of skills identified in the skill map.

Figure 10:
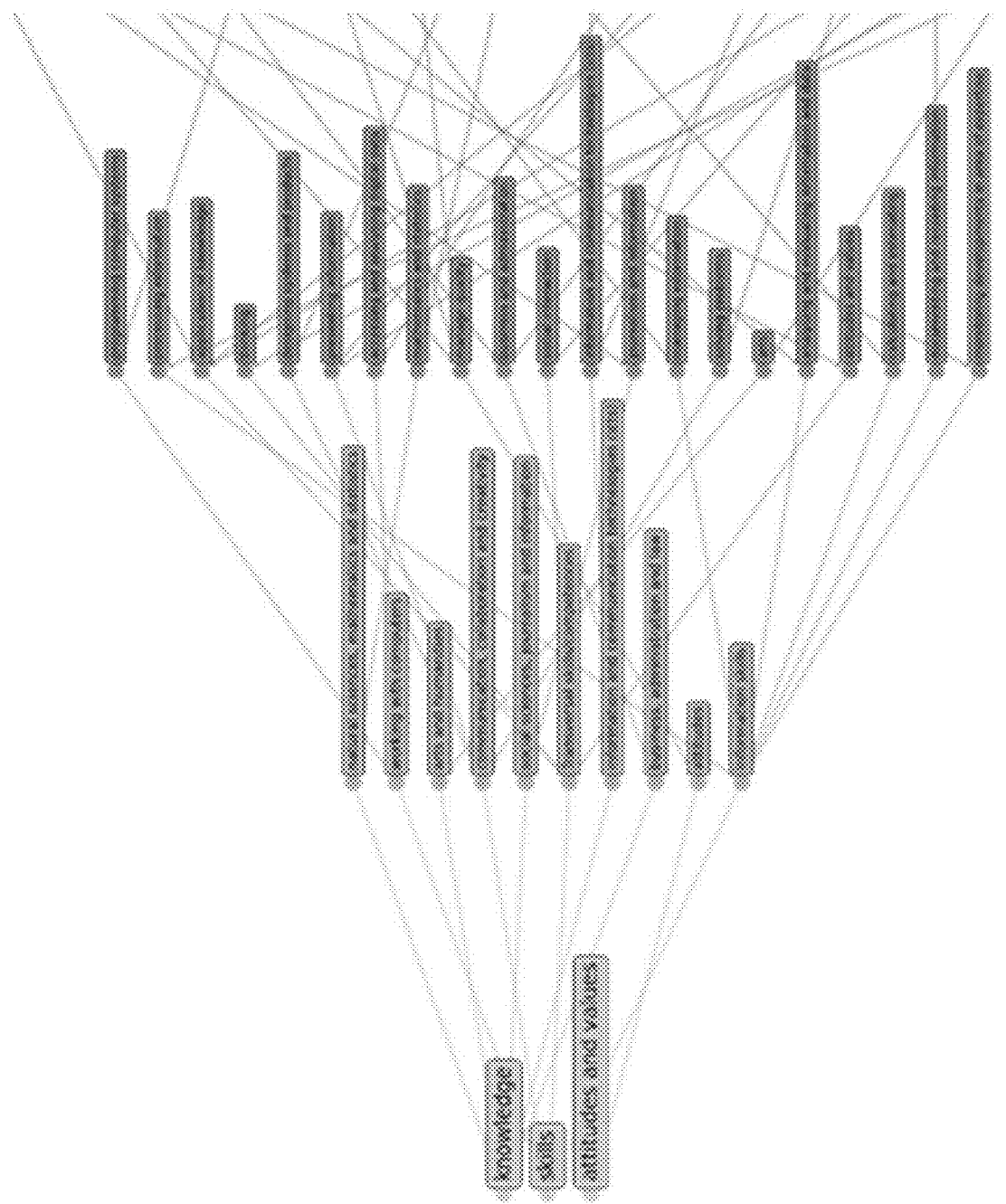
FIG. 10 provides another illustrative skill ontology, in accordance with embodiments of the application.

FIG. 10 provides an illustrative skill ontology, in accordance with embodiments of the application. For example, ontology platform 300 may map the skill map to the skill ontology. The mapping of the skill map to the ontology enables analysis of high level skill categories for a user, a department, or the entire organization. In some examples, the levels of the ontology may be limited, as shown in FIG. 10 (e.g., to the top three levels of the ontology for the "data scientist" skill set).

FIG. 11 provides illustrative user interfaces for setting up a user profile, in accordance with embodiments of the application. One or more skills may be returned to user interface 1110. The user can proceed to look at a list of skills associated with the title and remove some or add custom additional skills, as illustrated in user interface 1120. The associated skills are loaded from the job and skill ontology. After selecting the skills, a connection to these skills is added to the profile of the new user.

In some examples, the users have a job title provided by an authentication system and no list of skills is shown. In these cases, a background process processes these job titles and connects the users with the skills of their respective job title via the ontology.

In some examples, a similar background job can connect users with the same job title to skills that other users with the same job title have, but are not present in the ontology.

Figure 12:
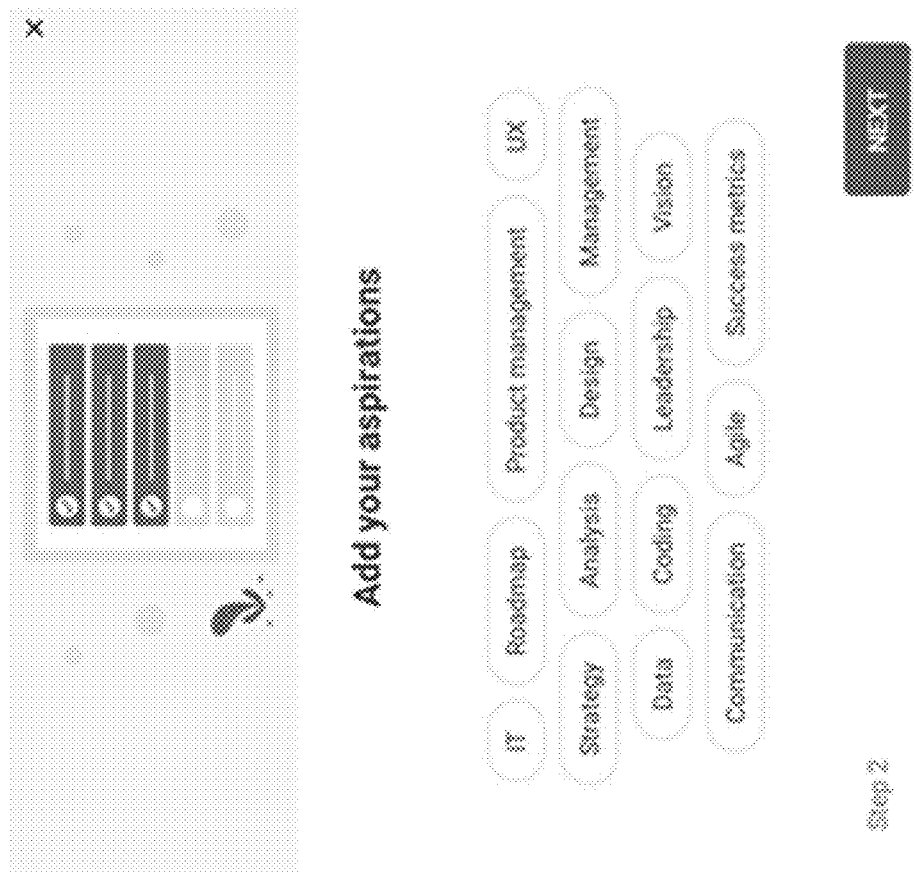
FIG. 12 provides an illustrative list of aspirations, in accordance with embodiments of the application.

FIG. 12 provides an illustrative list of aspirations, in accordance with embodiments of the application.

Figure 13:
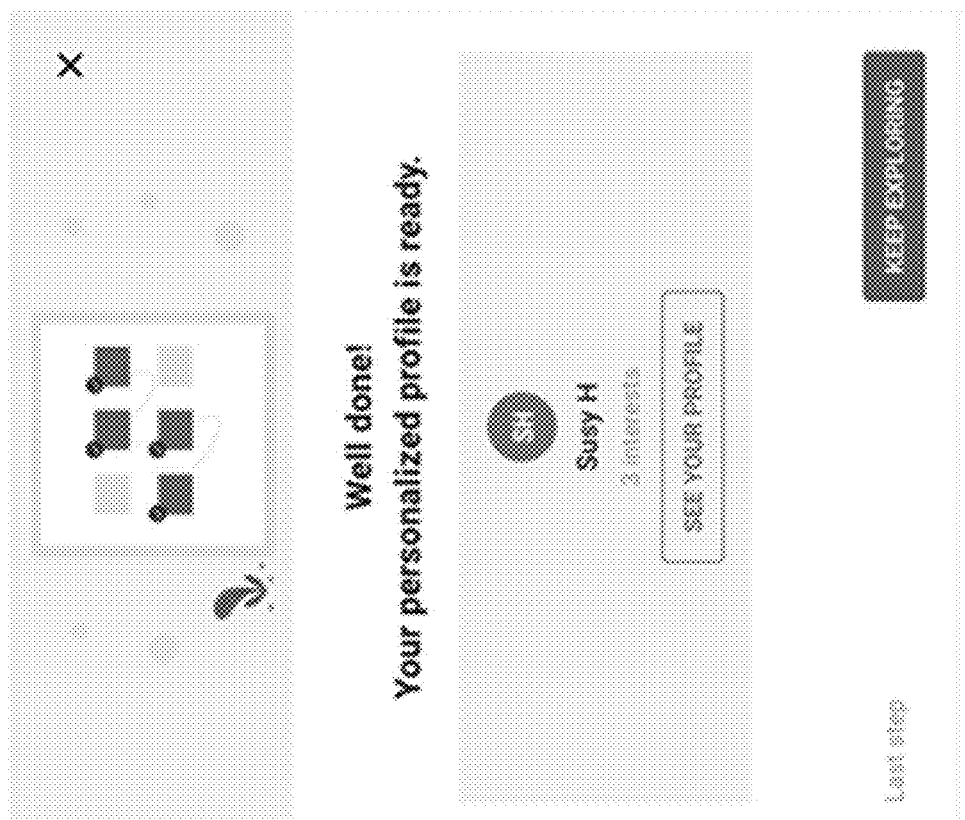
FIG. 13 provides an illustrative user interface for accessing the user profile, in accordance with embodiments of the application.

FIG. 13 provides an illustrative user interface for accessing the user profile, in accordance with embodiments of the application.

FIG. 14 provides an illustrative user interface to provide a set of projects, in accordance with embodiments of the application. For example, the user interface may be populated with open projects or jobs within the organization. The set of projects may be filtered to match the skill mapping by a match score. The match score may be calculated using a combination of the users' automatic skill scores, manually set proficiency scores, and aspirations compared with a particular project from the set of projects. The match score may help determine how well the characteristics of the user matched to the project.

The set of projects may be a list of currently available jobs/projects within an organization. The searching user may filter the available jobs/projects by location, workload, best matches (e.g., highest match score, etc.), start date, or other relevant criteria. An administrative user may create a job or project on a portal using a description and a list of relevant skill.

The user interface may include the user's match score representing how well each project matches their abilities. This match score may be calculated by combining the automatically detected skills, the manually set skills, and the skill aspirations that the user stated.

Figure 15:
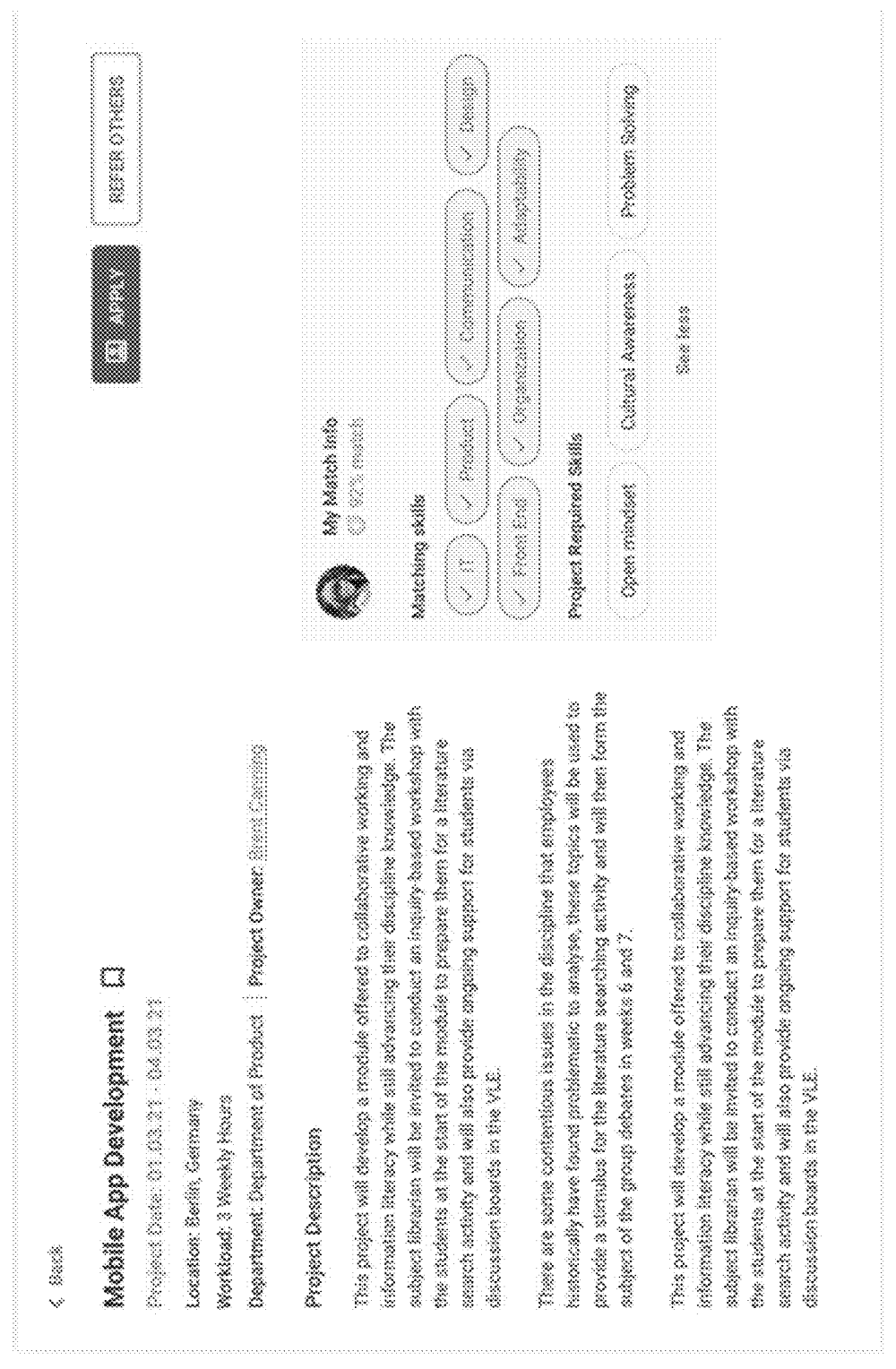

FIG. 15 provides an illustrative user interface to applying for a project, in accordance with embodiments of the application. For example, the user may select a project from the set of projects in FIG. 14 and apply for the project. The author of the job/project may see the application, the matching score, and the matching and non-matching skills associated with the user and the project in order to determine if the applicant is a good match. In some examples, the author can see the matching and non-matching skills that the user has in relation to the job/project.

These and other objects, features, and characteristics of the system and/or method disclosed herein, as well as the methods of operation and functions of the related elements of structure and the combination thereof, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Figure 16:
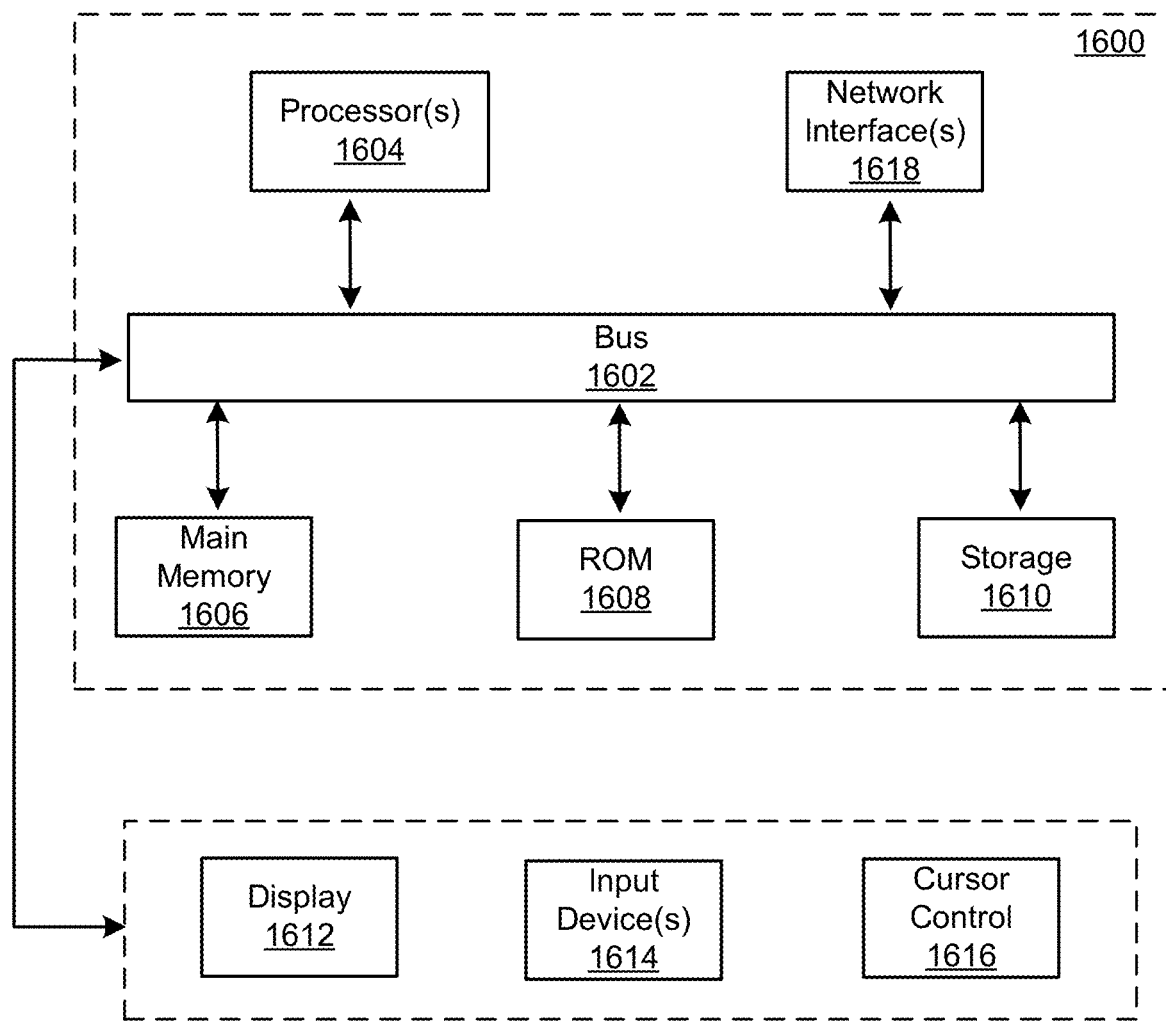
FIG. 16 is an example computing component that may be used to implement various features of embodiments described in the present disclosure.

FIG. 16 depicts a block diagram of an example computer system 1600 in which various of the embodiments described herein may be implemented. The computer system 1600 includes a bus 1602 or other communication mechanism for communicating information, one or more hardware processors 1604 coupled with bus 1602 for processing information. Hardware processor(s) 1604 may be, for example, one or more general purpose microprocessors.

The computer system 1600 also includes a main memory 1606, such as a random access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may be coupled via bus 1602 to a display 1612, such as a liquid crystal display (LCD) (or touch screen), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. In some embodiments, the same direction information and command selections as cursor control may be implemented via receiving touches on a touch screen without a cursor.

The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

The computer system 1600 also includes a communication interface 1618 coupled to bus 1602. Communication interface 1618 provides a two-way data communication coupling to one or more network links that are connected to one or more local networks. For example, communication interface 1618 may be an integrated services digital network (ISDN) card, cable modem, satellite modem, or a modem to provide a data communication connection to a corresponding type of telephone line. As another example, communication interface 1618 may be a local area network (LAN) card to provide a data communication connection to a compatible LAN (or WAN component to communicated with a WAN). Wireless links may also be implemented. In any such implementation, communication interface 1618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1618, which carry the digital data to and from computer system 1600, are example forms of transmission media.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system for generating, maintaining and using an ontology-based technology platform and job titles data structure for mapping skills with job titles, the system comprising:
   a memory;
   one or more processors configured to execute machine readable instructions stored in the memory which when executed cause the processor to:
   preprocess an ontology of job titles and skills;
   initiate a filtering process that removes one or more alternative labels from a list of alternative labels and a preferred label in the ontology;
   map additional job titles to the ontology;
   obtain a set of skills based on a job title;
   map expertise topics to skills to generate expertise profiles for users;
   select relevant parts of an ontology tree for a user; and
   map user input job titles to actual job titles in the ontology; and
   a group classifier module comprising a neural network or machine learning module trained on a training data set comprising a vector representation of each job title wherein the vectors are inputs and a job group predictions; the ontology platform further configured to use the trained group classifier to classify job titles from a thesaurus of job titles to determine synonyms and alternative terms used for the job titles stored in the job titles data structure.

2. The system of claim 1, the ontology-based technology platform comprising:
   a data structure stored in the memory comprising a dataset comprising a set of job titles and corresponding skills, where jobs are classified according to a classification of occupations, the occupations being stored with a second preferred label and a second list of alternative labels, and a mapping of job titles with the corresponding skills.

3. The system of claim 1, the data structure further configured such that the skills are organized with several hierarchical layers, including a set of nodes comprising major job groups as a top layer and multiple lower level hierarchical layers of skills within each group.

4. The system of claim 1, comprising a group skills classifier module, a search module, and job wizard module, with one or more data stores including an ontology data store, a job titles data store and skill data store, wherein:
   the group skills classifier module is configured to create and maintain one or more data structures comprising a multilingual classification of skills, competences, qualifications and occupations;
   the search module is configured to search, upon receiving a query including one or more job titles, for the occupations matching the job titles in the query.

5. The system of claim 4, wherein the job titles data store includes one or more job titles, the job titles comprising a second preferred label and any associated qualifier and a second alternative label corresponding to an alternative name of the job and wherein the job wizard module is configured to process the job titles to generate a second list of possible alternative labels.

6. The system of claim 1, wherein the job titles data store comprises information stored in association with a job title, including a degree level or professional certificate needed to hold the job title; a second preferred label and second alternative label; a language, a description, and connected skills.

7. The system of claim 1, comprising a classification algorithm configured to determine a mapping between a job group and skills and assign skills to a newly identified job title.

8. The system of claim 1, comprising a classification algorithm configured to determine from the ontology for each major job group the most common skills under the group.

9. The system of claim 1, the ontology platform comprising a connector interface module, a modeling module, an opportunity matching module and one or more data stores including an ontology data store, a job titles data store, and skill data store;
   the connector interface module configured to provide interfaces to a set of data sources that contain user skill detection data;
   the modeling module configured to combine the skill detection data from the different data sources into a single expertise model;
   the opportunity matching module configured to match user skills and aspirations to jobs and projects.

10. The system of claim 1, further comprising a user profile module configured to create and manage user profiles and configured to:
    assign relevant skills to users based on the knowledge of their job title; and
    update a user profile based on topics with which a user interacts; and
    further comprising a scoring module configured to generate an expertise score that reflects how strong a user is connected to a topic based on the users interactions with the topics and in relation to other users.

11. The system of claim 10, the scoring module configured to generate an initial expertise score for a user, wherein the initial expertise score is higher for skills that are determined, based on the ontology, to be essential for an occupation determined via the user's job title matched to the occupation in the ontology and lower for skills that are determined to be optional for the occupation.

12. The system of claim 1, the ontology platform comprising a detection and routing module configured to provide a question and answer platform with automatic expert detection and question routing.

13. A method for generating, maintaining and using an ontology-based technology platform and job titles data structure for mapping skills with job titles, the platform comprising:
    a memory; and
    one or more processors configured to execute machine readable instructions stored in the memory which when executed cause the processor to perform the method of:

preprocessing an ontology of job titles and skills;
initiating a filtering process that removes one or more alternative labels from a list of alternative labels and a preferred label in the ontology;
mapping additional job titles to the ontology;
obtaining a set of skills based on a job title;
mapping expertise topics to skills to generate expertise profiles for users;
selecting relevant parts of the ontology tree for a user; and
mapping user input job titles to actual job titles in the ontology; and
wherein the ontology-based technology platform comprises a group classifier module comprising a neural network or machine learning module trained on a training data set comprising a vector representation of each job title wherein the vectors are inputs and a job group predictions; the ontology platform further configured to use the trained group classifier to classify job titles from a thesaurus of job titles to determine synonyms and alternative terms used for the job titles stored in the job titles data structure.

14. The method of claim 13, the ontology-based technology platform comprising:
a data structure stored in the memory comprising a dataset comprising a set of job titles and corresponding skills, where jobs are classified according to a classification of occupations, the occupations being stored with a second preferred label and a second list of alternative labels, and a mapping of job titles with the corresponding skills.

15. The method of claim 13, the data structure further configured such that the skills are organized with several hierarchical layers, including a set of nodes comprising major job groups as a top layer and multiple lower level hierarchical layers of skills within each group.

16. The method of claim 13, comprising a group skills classifier module, a search module, and job wizard module, with one or more data stores including an ontology data store, a job titles data store and skill data store, wherein:
the group skills classifier module is configured to create and maintain one or more data structures comprising a multilingual classification of skills, competences, qualifications and occupations;
the search module is configured to search, upon receiving a query including one or more job titles, for the occupations matching the job titles in the query.

17. The method of claim 16, wherein the job titles data store includes one or more job titles, the job titles comprising a second preferred label and any associated qualifier and a second alternative label corresponding to an alternative name of the job and wherein the job wizard module is configured to process the job titles to generate a second list of possible alternative labels.

18. The method of claim 13, wherein the job titles data store comprises information stored in association with a job title, including a degree level or professional certificate needed to hold the job title; a second preferred label and second alternative label; a language, a description, and connected skills.

19. The method of claim 13, comprising a classification algorithm configured to determine a mapping between a job group and skills and assign skills to a newly identified job title.

20. The method of claim 13, comprising a classification algorithm configured to determine from the ontology for each major job group the most common skills under the group.

21. The method of claim 13, the ontology platform comprising a connector interface module, a modeling module, an opportunity matching module and one or more data stores including an ontology data store, a job titles data store, and skill data store;
the connector interface module configured to provides interfaces to a set of data sources that contain user skill detection data;
the modeling module configured to combine the skill detection data from the different data sources into a single expertise model;
the opportunity matching module configured to match user skills and aspirations to jobs and projects.

22. The method of claim 13, further comprising a user profile module configured to create and manage user profiles and configured to:
assign relevant skills to users based on the knowledge of their job title; and
update a user profile based on topics with which a user interacts; and
further comprising a scoring module configured to generate an expertise score that reflects how strong a user is connected to a topic based on the users interactions with the topics and in relation to other users.

23. The method of claim 22, the scoring module configured to generate an initial expertise score for a user, wherein the initial expertise score is higher for skills that are determined, based on the ontology, to be essential for an occupation determined via the user's job title matched to the occupation in the ontology and lower for skills that are determined to be optional for the occupation.

24. The method of claim 13, the ontology platform comprising a detection and routing module configured to provide a question and answer platform with automatic expert detection and question routing.

25. A system for generating, maintaining and using an ontology-based technology platform and job titles data structure for mapping skills with job titles, the system comprising:
a memory;
one or more processors configured to execute machine readable instructions stored in the memory which when executed cause the processor to:
select relevant parts of an ontology tree for a user; and
map user input job titles to actual job titles in the ontology; and
a group classifier module comprising a neural network or machine learning module trained on a training data set comprising a vector representation of each job title wherein the vectors are inputs and a job group predictions; the ontology platform further configured to use the trained group classifier to classify job titles from a thesaurus of job titles to determine synonyms and alternative terms used for the job titles stored in the job titles data structure.

* * * * *